United States Patent
Ilic et al.

(10) Patent No.: US 10,484,561 B2
(45) Date of Patent: Nov. 19, 2019

(54) METHOD AND APPARATUS FOR SCANNING AND PRINTING A 3D OBJECT

(71) Applicant: ML Netherlands C.V., Amsterdam (NL)

(72) Inventors: Alexander Ilic, Zurich (CH); Benedikt Koeppel, Zurich (CH)

(73) Assignee: ML Netherlands C.V., Amsterdam (NL)

( * ) Notice: Subject to any disclaimer, the term of this patent is extended or adjusted under 35 U.S.C. 154(b) by 0 days.

(21) Appl. No.: 15/308,959

(22) PCT Filed: May 11, 2015

(86) PCT No.: PCT/EP2015/060320
§ 371 (c)(1),
(2) Date: Nov. 4, 2016

(87) PCT Pub. No.: WO2015/173173
PCT Pub. Date: Nov. 19, 2015

(65) Prior Publication Data
US 2017/0085733 A1 Mar. 23, 2017

Related U.S. Application Data

(60) Provisional application No. 61/992,601, filed on May 13, 2014, provisional application No. 61/992,204, filed on May 12, 2014.

(51) Int. Cl.
*H04N 13/271* (2018.01)
*H04N 13/275* (2018.01)
(Continued)

(52) U.S. Cl.
CPC .......... *H04N 1/00827* (2013.01); *B33Y 50/00* (2014.12); *G01B 11/24* (2013.01);
(Continued)

(58) Field of Classification Search
None
See application file for complete search history.

(56) References Cited

U.S. PATENT DOCUMENTS

| 4,767,923 A | 8/1988 | Yuasa |
| 4,797,544 A | 1/1989 | Montgomery et al. |

(Continued)

FOREIGN PATENT DOCUMENTS

| DE | 19858935 A1 | 6/2000 |
| EP | 0277964 A1 | 8/1988 |

(Continued)

OTHER PUBLICATIONS

Carlo Sammarco; 123D Catch—Tutorial; Jan. 17, 2012; Digital Culture-123D Catch: Tutorial; http://dclabs.wikispaces.asu.edu/file/view/123D+Catch_tutorial.pdf.*
(Continued)

*Primary Examiner* — Peter Hoang
(74) *Attorney, Agent, or Firm* — Wolf, Greenfield & Sacks, P.C.

(57) ABSTRACT

A smartphone may be freely moved in three dimensions as it captures a stream of images of an object. Multiple image frames may be captured in different orientations and distances from the object and combined into a composite image representing an three-dimensional image of the object. The image frames may be formed into the composite image based on representing features of each image frame a set of points in a three dimensional depth map. Coordinates of the points in the depth map may be estimated with a level of certainty. The level of certainty may be used to determine which points are included in the composite image. The selected points may be smoothed and a mesh model may be formed by creating a convex hull of the selected points. The mesh model and associated texture information may be used to render a three-dimensional representation of the object on a two-dimensional display. Additional techniques include processing and formatting of the three-dimensional representation data to be printed by a three-dimensional printer so a three-dimensional model of the object may be formed.

25 Claims, 20 Drawing Sheets

(51) Int. Cl.
   *G06T 19/20*     (2011.01)
   *G06T 7/55*      (2017.01)
   *G06T 15/04*     (2011.01)
   *H04N 13/221*    (2018.01)
   *H04N 1/00*      (2006.01)
   *G01B 11/24*     (2006.01)
   *G06T 7/73*      (2017.01)
   *B33Y 50/00*     (2015.01)
   *G06T 17/20*     (2006.01)

(52) U.S. Cl.
   CPC .............. *G06T 7/55* (2017.01); *G06T 7/74* (2017.01); *G06T 15/04* (2013.01); *G06T 17/20* (2013.01); *G06T 19/20* (2013.01); *H04N 13/221* (2018.05); *H04N 13/271* (2018.05); *H04N 13/275* (2018.05); *G06T 2200/08* (2013.01); *G06T 2207/10016* (2013.01); *G06T 2207/10028* (2013.01); *G06T 2207/20076* (2013.01); *G06T 2207/30244* (2013.01); *G06T 2219/2021* (2013.01)

(56) References Cited

U.S. PATENT DOCUMENTS

| | | |
|---|---|---|
| 4,804,949 A | 2/1989 | Faulkerson |
| 4,906,843 A | 3/1990 | Jones et al. |
| 5,355,146 A | 10/1994 | Chiu et al. |
| 5,574,804 A | 11/1996 | Olschafskie et al. |
| 5,578,813 A | 11/1996 | Allen et al. |
| 5,611,033 A | 3/1997 | Pitteloud et al. |
| 5,685,002 A | 11/1997 | Sano |
| 5,880,740 A | 3/1999 | Halliday et al. |
| 5,909,209 A | 6/1999 | Dickinson |
| 5,917,935 A | 6/1999 | Hawthorne et al. |
| 5,994,710 A | 11/1999 | Knee et al. |
| 6,005,681 A | 12/1999 | Pollard |
| 6,047,132 A | 4/2000 | Maeda |
| 6,078,701 A | 6/2000 | Hsu et al. |
| 6,233,363 B1 | 5/2001 | Iida |
| 6,249,360 B1 | 6/2001 | Pollard et al. |
| 6,304,248 B1 | 10/2001 | Shiobara et al. |
| 6,304,284 B1 | 10/2001 | Dunton et al. |
| 6,344,846 B1 | 2/2002 | Hines |
| 6,348,981 B1 | 2/2002 | Walsh |
| 6,392,632 B1 | 5/2002 | Lee |
| 6,429,422 B1 | 8/2002 | Bohn |
| 6,459,819 B1 | 10/2002 | Nakao |
| 6,513,717 B2 | 2/2003 | Hannigan |
| 6,525,306 B1 | 2/2003 | Bohn |
| 6,648,483 B1 | 11/2003 | Kuo |
| 6,657,667 B1 | 12/2003 | Anderson |
| 6,710,768 B2 | 3/2004 | Muranami |
| 6,783,069 B1 | 8/2004 | Hecht et al. |
| 6,901,166 B1 | 5/2005 | Nakayama |
| 6,965,460 B1 | 11/2005 | Gann et al. |
| 6,982,764 B1 | 1/2006 | Heath |
| 7,038,664 B2 | 5/2006 | Danzyger et al. |
| 7,075,572 B2 | 7/2006 | Kinjo |
| 7,119,816 B2 | 10/2006 | Zhang et al. |
| 7,123,292 B1 | 10/2006 | Seeger et al. |
| 7,133,068 B2 | 11/2006 | Fisher et al. |
| 7,221,810 B2 | 5/2007 | Andreasson et al. |
| 7,317,448 B1 | 1/2008 | Sasselli et al. |
| 7,424,218 B2 | 9/2008 | Baudisch et al. |
| 7,439,954 B2 | 10/2008 | Theytaz et al. |
| 7,474,767 B2 | 1/2009 | Sen et al. |
| 7,518,767 B2 | 4/2009 | Chen et al. |
| 7,796,304 B2 | 9/2010 | Silverbrook |
| 7,855,812 B2 | 12/2010 | Gelsomini et al. |
| 7,884,970 B2 | 2/2011 | Hiroyasu et al. |
| 7,957,009 B2 | 6/2011 | Silverbrook |
| 7,961,364 B2 | 6/2011 | Lapstun et al. |
| 8,106,886 B2 | 1/2012 | Chang |
| 8,120,820 B2 | 2/2012 | Lapstun et al. |
| 8,179,563 B2 | 5/2012 | King et al. |
| 8,189,965 B2 | 5/2012 | Edgar et al. |
| 8,218,020 B2 | 7/2012 | Tenchio et al. |
| 8,259,161 B1 * | 9/2012 | Huang .................. G03B 35/02 348/50 |
| 8,331,723 B2 | 12/2012 | Ozluturk |
| 8,339,467 B2 | 12/2012 | Zahnert et al. |
| 8,380,005 B1 | 2/2013 | Jonsson et al. |
| 8,384,947 B2 | 2/2013 | Edgar et al. |
| 8,416,468 B2 | 4/2013 | Underwood et al. |
| 8,433,143 B1 | 4/2013 | Carson et al. |
| 8,441,695 B2 | 5/2013 | Zahnert et al. |
| 8,441,696 B2 | 5/2013 | Zahnert et al. |
| 8,477,394 B2 | 7/2013 | Jonsson et al. |
| 8,570,588 B2 | 10/2013 | Edgar et al. |
| 8,582,182 B2 | 11/2013 | Zahnert et al. |
| 8,693,047 B2 | 4/2014 | Edgar et al. |
| 8,723,885 B2 | 5/2014 | Zahnert et al. |
| 8,786,897 B2 | 7/2014 | Edgar et al. |
| 8,904,479 B1 | 12/2014 | Johansson et al. |
| 9,270,857 B2 | 2/2016 | Edgar et al. |
| 9,300,834 B2 | 3/2016 | Zahnert et al. |
| 9,465,129 B1 | 10/2016 | Olsson et al. |
| 9,723,203 B1 | 8/2017 | Ettinger |
| 9,912,847 B1 | 3/2018 | Yuan et al. |
| 10,142,522 B2 | 11/2018 | Ilic |
| 10,225,428 B2 | 3/2019 | Zahnert et al. |
| 2001/0022860 A1 | 9/2001 | Kitamura et al. |
| 2002/0001418 A1 | 1/2002 | Fahraeus et al. |
| 2002/0030748 A1 | 3/2002 | Kitaguchi et al. |
| 2002/0181762 A1 | 12/2002 | Silber |
| 2002/0190953 A1 | 12/2002 | Gordon et al. |
| 2004/0028295 A1 | 2/2004 | Allen et al. |
| 2004/0085464 A1 | 5/2004 | Higurashi et al. |
| 2004/0141157 A1 | 7/2004 | Ramachandran et al. |
| 2004/0189674 A1 | 9/2004 | Zhang et al. |
| 2004/0208369 A1 | 10/2004 | Nakayama |
| 2004/0218055 A1 | 11/2004 | Yost et al. |
| 2004/0239771 A1 | 12/2004 | Habe |
| 2004/0264806 A1 | 12/2004 | Herley |
| 2005/0057510 A1 | 3/2005 | Baines et al. |
| 2005/0129291 A1 | 6/2005 | Boshra |
| 2005/0168614 A1 | 8/2005 | Okada et al. |
| 2005/0212955 A1 | 9/2005 | Craig et al. |
| 2005/0231482 A1 | 10/2005 | Theytaz et al. |
| 2005/0248532 A1 | 11/2005 | Moon et al. |
| 2005/0270483 A1 | 12/2005 | Fujimatsu et al. |
| 2006/0062427 A1 | 5/2006 | Burkhart et al. |
| 2006/0170781 A1 | 8/2006 | Sobol |
| 2007/0025723 A1 | 2/2007 | Baudisch et al. |
| 2007/0031062 A1 | 2/2007 | Pal et al. |
| 2007/0031063 A1 | 2/2007 | Zhou |
| 2007/0076944 A1 | 4/2007 | Bryll et al. |
| 2007/0121146 A1 | 5/2007 | Nesbit et al. |
| 2008/0101786 A1 | 5/2008 | Pozniansky et al. |
| 2008/0130077 A1 | 6/2008 | Park et al. |
| 2008/0168070 A1 | 7/2008 | Naphade et al. |
| 2008/0215286 A1 | 9/2008 | Mealy et al. |
| 2008/0219654 A1 | 9/2008 | Border et al. |
| 2008/0260366 A1 | 10/2008 | Brosnan et al. |
| 2009/0021576 A1 | 1/2009 | Linder et al. |
| 2009/0032600 A1 | 2/2009 | Lapstun et al. |
| 2009/0060283 A1 | 3/2009 | Bledsoe et al. |
| 2009/0080035 A1 | 3/2009 | Downs |
| 2010/0054627 A1 | 3/2010 | Rosenberg |
| 2010/0111441 A1 | 5/2010 | Xiong et al. |
| 2010/0123907 A1 | 5/2010 | Edgar et al. |
| 2010/0124384 A1 | 5/2010 | Edgar et al. |
| 2010/0149368 A1 | 6/2010 | Yamashita et al. |
| 2010/0194919 A1 | 8/2010 | Ishii et al. |
| 2010/0245344 A1 | 9/2010 | Chen et al. |
| 2010/0295868 A1 | 11/2010 | Zahnert et al. |
| 2010/0296129 A1 | 11/2010 | Zahnert et al. |
| 2010/0296131 A1 | 11/2010 | Zahnert et al. |
| 2010/0296133 A1 | 11/2010 | Zahnert et al. |
| 2010/0296137 A1 | 11/2010 | Zahnert et al. |
| 2010/0296140 A1 | 11/2010 | Zahnert et al. |
| 2011/0025842 A1 | 2/2011 | King et al. |

(56) References Cited

U.S. PATENT DOCUMENTS

| | | | |
|---|---|---|---|
| 2011/0087350 A1* | 4/2011 | Fogel | G06F 17/50 |
| | | | 700/98 |
| 2011/0228044 A1 | 9/2011 | Miyamoto et al. | |
| 2011/0234497 A1 | 9/2011 | Zahnert et al. | |
| 2011/0314049 A1 | 12/2011 | Poirier et al. | |
| 2012/0128340 A1 | 5/2012 | Lai | |
| 2012/0133746 A1 | 5/2012 | Bigioi et al. | |
| 2012/0155846 A1 | 6/2012 | Gilbert-Schachter et al. | |
| 2012/0249554 A1 | 10/2012 | Chen et al. | |
| 2013/0027757 A1 | 1/2013 | Lee et al. | |
| 2013/0120595 A1 | 5/2013 | Roach et al. | |
| 2013/0300740 A1* | 11/2013 | Snyder | G06F 3/016 |
| | | | 345/420 |
| 2014/0043436 A1* | 2/2014 | Bell | G06T 19/20 |
| | | | 348/46 |
| 2014/0072201 A1 | 3/2014 | Tilt | |
| 2014/0118483 A1 | 5/2014 | Rapoport et al. | |
| 2014/0321771 A1 | 10/2014 | Reinisch et al. | |
| 2015/0015735 A1 | 1/2015 | Rav-Acha et al. | |
| 2015/0077768 A1 | 3/2015 | Edgar et al. | |
| 2015/0103189 A1 | 4/2015 | Karpenko | |
| 2015/0199384 A1 | 7/2015 | Boncyk et al. | |
| 2015/0339530 A1 | 11/2015 | Neckels et al. | |
| 2016/0035082 A1 | 2/2016 | King et al. | |
| 2016/0173716 A1 | 6/2016 | Zahnert et al. | |
| 2016/0227181 A1 | 8/2016 | Ilic et al. | |
| 2016/0309085 A1 | 10/2016 | Ilic | |
| 2016/0328827 A1 | 11/2016 | Ilic et al. | |
| 2016/0330374 A1 | 11/2016 | Ilic et al. | |
| 2016/0352979 A1 | 12/2016 | Ilic | |
| 2016/0360119 A1 | 12/2016 | Ilic | |
| 2017/0034429 A1 | 2/2017 | Huysegems et al. | |
| 2017/0118399 A1 | 4/2017 | Kim et al. | |
| 2017/0118409 A1 | 4/2017 | Im et al. | |

FOREIGN PATENT DOCUMENTS

| | | |
|---|---|---|
| EP | 1126404 A1 | 8/2001 |
| EP | 1164538 A2 | 12/2001 |
| EP | 2189926 A1 | 5/2010 |
| EP | 2339534 A1 | 6/2011 |
| GB | 2336195 A | 10/1999 |
| JP | 2000-069352 A | 3/2000 |
| JP | 2000-175185 A | 6/2000 |
| JP | 2002-311471 A | 10/2002 |
| JP | 2009-232275 A | 10/2009 |
| JP | 2011-130282 A | 6/2011 |
| JP | 2012-078495 A | 4/2012 |
| JP | 2013-148824 A | 8/2013 |
| WO | WO 03/091868 A1 | 11/2003 |
| WO | WO 2006/085827 A1 | 8/2006 |
| WO | WO 2007/029903 A1 | 3/2007 |
| WO | WO 2015/028587 A2 | 3/2015 |
| WO | WO 2015/082572 A2 | 6/2015 |

OTHER PUBLICATIONS

Extended European Search Report and Written Opinion dated Aug. 31, 2010 from corresponding European Application No. 10163475.6.

European Search Report dated Nov. 29, 2010 from corresponding European Application No. 10163475.6.

Extended European Search Report dated Sep. 7, 2016 from corresponding European Application No. 16172971.0.

International Search Report and Written Opinion dated Jun. 1, 2011, from International Application No. PCT/EP2011/053775.

International Preliminary Report on Patentability dated Apr. 19, 2012, from International Application No. PCT/EP2011/053775.

International Search Report and Written Opinion for Application No. PCT/EP2014/068337 dated Mar. 17, 2015.

International Seach Report and Written Opinion for Application No. PCT/EP2014/076469 dated Jun. 30, 2015.

International Search Report and Written Opinion for Application No. PCT/EP2015/050038 dated Mar. 19, 2015.

International Search Report and Written Opinion for Application No. PCT./EP2015/050036 dated Apr. 7, 2015.

International Search Report and Written Opinion for International Application No. PCT/EP2015/060320 dated Aug. 4, 2015.

International Preliminary Report on Patentability for International Application No. PCT/EP2015/060320 dated Nov. 24, 2016.

[No Author Listed], DIY Mouse Scanner. ttp://www.diylive.net/index.php/2007/07/20/diy-mouse-scanner/> [retrieved on Feb. 8, 2010.] 1 page.

[No Author Listed], Learn how to use 123d Catch. 123d Catch. May 2, 2014; Retrieved from the internet: http://web.archive.org/web/20140502092851/http://www.123dapp.com/howto/catch [retrieved on Sep. 7, 2015]. 16 pages.

[No Author Listed], The basic rules for STL files. SDPRINTUK. May 3, 2014; Retrieved form the Internet: http://web.archive.org/web/20140503142737/http://www.3dprint-uk.co.uk/the-basic-rules-for-stl-files/ [retrieved on Sep. 7, 2015]. 1 page.

[No Author Listed], Turn ordinary photos into extraordinary 3D models with 123D catch. 123 Catch. May 11, 2014; Retrieved from the Internet: http://web.archive.org/web/20140511055906/http://www.123dapp.com/catch [retrieved on Sep. 7, 2015]. 6 pages.

Brown, A Survey of Image Registration Techniques. ACM Computing Surveys. Dec. 1992; 24(4): 325-76.

Huang et al., Animated panorama from a panning video sequence. Image and Vision Computing New Zealand (IVCNZ), 2010 25th International Conference of, IEEE. Nov. 8, 2010. pp. 1-8.

Kolev et al., Turning Mobile Phones into 3D Scanners. 2014 IEEE Conference on Computer Vision and Pattern Recognition, IEEE. Jun. 23, 2014; pp. 3946-3953.

Lin et al., Diffuse-Specular Separation and Depth Recovery from Image Sequences. Correct System Design. 2002;23 52:16 pages.

Lopez et al., Graphics hardware accelerated panorama builder for mobile phones. Proc. of SPIE-IS&T Electronic Imaging. Jan. 19, 2009; 7256:72560D1-D9.

Lucas et al., An Iterative Image Registration Technique with an Application to Stereo Vision. Proceedings of Imaging Understanding Workshop. 1981; pp. 121-129.

Melantoni, 123D Design desktop 1A: 3D file import and 3D printing enhancmeent. May 8, 2014; Retrieved from the Internet: http://blog123dapp.com/2014/05/123d-design-desktop-1-4-3d-file-import-and-3d-printing-enhancements. [retrieved on Aug. 7, 2015].

Nakao et al., An Image Input Unit Using Digital Mosaic Processing. NEC Research and Development. Apr. 1, 1999; 40 (2):259-66.

Tanskanen et al., Live Metric 3D Reconstruction on Mobile Phones. 2013 IEEE International Conference on Computer Vision. Dec. 1, 2013; pp. 65-72.

Yang et al., Inertial sensors image alignmnet and stitching for panorama on mobile phones. Proceedings of the 1st International Workshop on Mobile Location-Based Service, MLBS '11. New York, New York. Sep. 16, 2011. p. 21.

European Communication for European Application No. 16172980.1 dated Jan. 8, 2018.

[No Author Listed], capturing text for OCR in lowlight-ideal minimum MP + >?s. Cameras Forum—CNET. Https://www.cnet.com/forums/discussions/capturing-text-for-ocr-in-lowlight-ideal-minimum-mp-s-29389/ 2004. 5 pages.

Nakajima et al., Video Mosaicing for Document Imaging. Proc CBDAR. Demo Session. Jan. 1, 2007. 8 pages.

U.S. Appl. No. 15/048,875, filed Feb. 19, 2016, Zahnert et al.
U.S. Appl. No. 14/914,926, filed Feb. 26, 2016, Ilic et al.
U.S. Appl. No. 15/101,264, filed Jun. 2, 2016, Ilic
U.S. Appl. No. 15/173,334, filed Jun. 3, 2016, Ilic.
U.S. Appl. No. 15/173,355, filed Jun. 3, 2016, Ilic.
U.S. Appl. No. 15/109,466, filed Jul. 1, 2016, Ilic et al.
U.S. Appl. No. 15/109,476, filed Jul. 1, 2016, Ilic et al.
EP 10163475.6, Nov. 29, 2010, European Search Report.
EP 10163475.6, Aug. 31, 2010, Extended European Search.
EP 16172971.0, Sep. 7, 2016, Extended European Search.
PCT/EP2011/053775, Jun. 1, 2011, International Search Report and Written Opinion.

(56) References Cited

OTHER PUBLICATIONS

PCT/EP2011/053775, Apr. 19, 2012, International Preliminary Report on Patentability.
PCT/EP2014/068337, Mar. 17, 2015, International Search Report and Written Opinion.
PCT/EP2014/076469, Jun. 30, 2015, International Search Report and Written Opinion.
PCT/EP2015/050038, Mar. 19, 2015, International Search Report and Written Opinion.
PCT/EP2015/050036, Apr. 7, 2015, International Search Report and Written Opinion.
PCT/EP2015/060320, Aug. 4, 2014, International Search Report and Written Opinion.
PCT/EP2015/060320, Nov. 24, 2016, International Preliminary Report on Patentability.
EP 16172980.1, Jan. 8, 2018, European Communication.

* cited by examiner

FIG. 13A

SYSTEMS FOR PERFORMING METHOD 10
...e embodiments,
the data source
ments. For exa
e and conductan
s and transmit
20 in real-time.
device, the data
0 may process t
rameters the dat
may be embodi
uter 920 includ
...perform step 13 of

FIG. 13B

SYSTEMS FOR PERFORMING METHOD 10
. In some embodiments,
odiments, the data sourc
measurements. For exa
h pressure and conductan
surements and transmit t
omputer 920 in real-time.
surement device, the data
mputer 920 may process t
ysical parameters the dat
puter 920 may be embodi
of computer 920 includ
tal assistants (PD
...perform step 13 of $(X_0, Y_0, \Theta_0)$ $(X_1, Y_1, \Theta_1)$

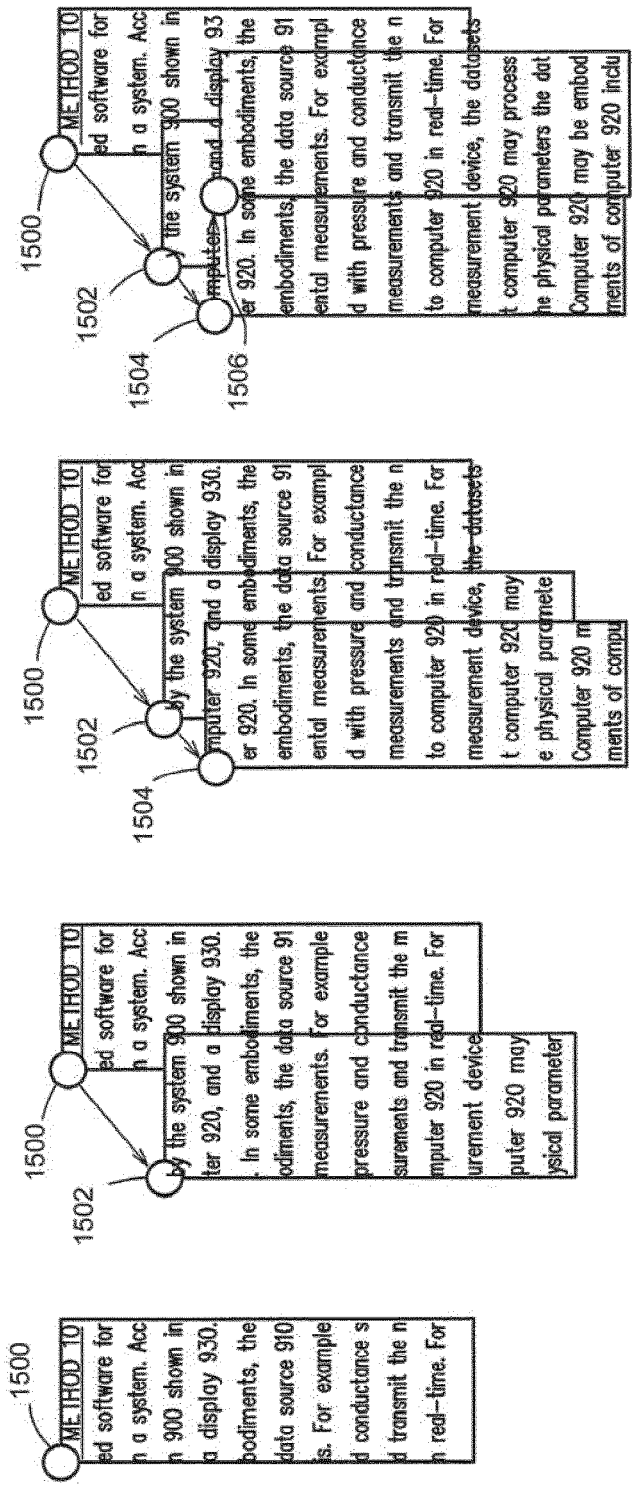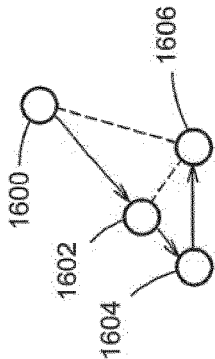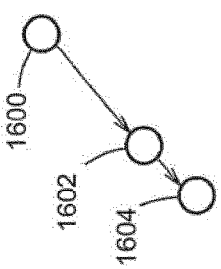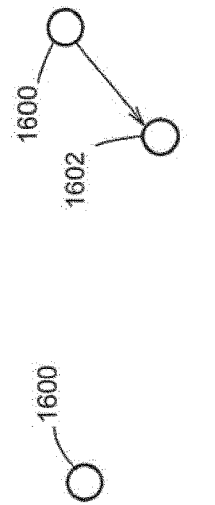

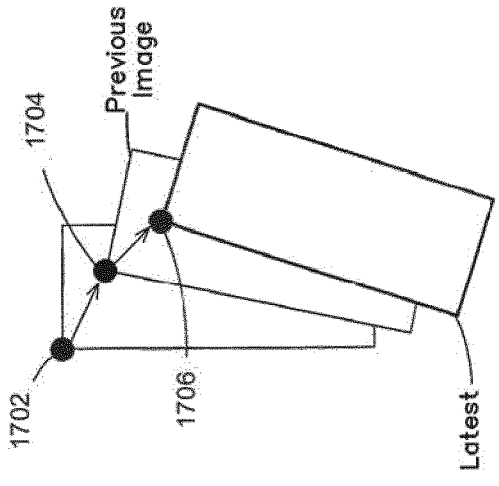
FIG. 17A
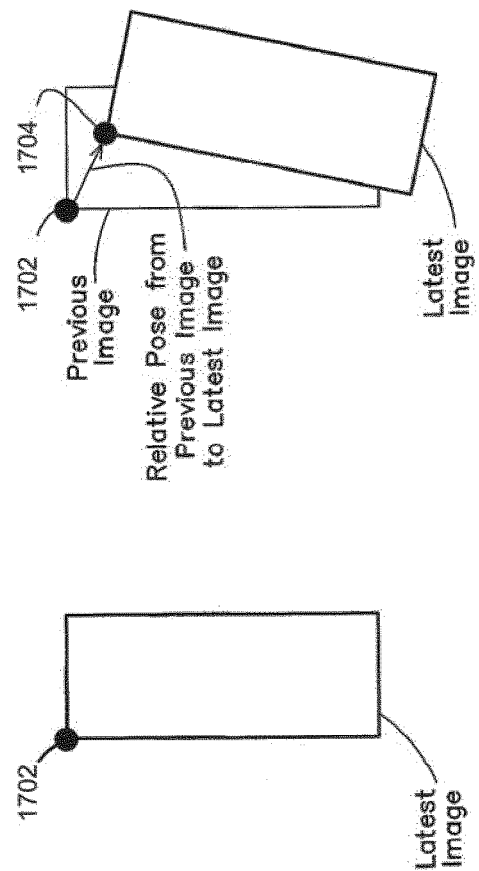
FIG. 17B
FIG. 17C
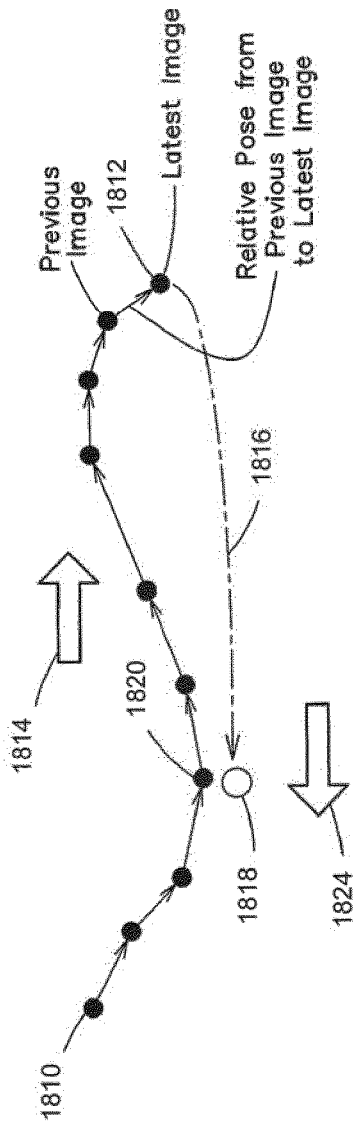
FIG. 18

```
100 0 obj       % the 3D annotation
    << /Type    /Annot
       /Subtype /3D
       /Rect [266 116 430 204]
       /AP <</N 200 0 R>>
       /3DD 300 0 R
    >>
endobj 200 0 obj       % the poster image
    << /Type /Xobject
       /Subtype /Image
       ...
    >>
    stream
        ... Poster image data ...
    endstream
endobj 300 0 obj       % the 3D stream (U3D file)
    << /Type    /3D
       /Subtype /U3D
       /3DPrintable % optional to indicate that model was checked for 3D printability
       ...
    >>
    stream
        ... U3D file with metadata for 3D printing ...
    endstream
endobj
```

FIG. 20

METHOD AND APPARATUS FOR SCANNING AND PRINTING A 3D OBJECT

CROSS REFERENCE TO RELATED APPLICATIONS

This application is a national stage filing under 35 U.S.C. § 371 of international application PCT/EP 2015/060320, entitled "METHOD AND APPARATUS FOR SCANNING AND PRINTING A 3D OBJECT," filed May 11, 2015, which claims the benefit under 35 U.S.C. § 119(e) of U.S. Provisional Application No. 61/992,601, entitled "METHOD AND APPARATUS FOR SCANNING AND PRINTING A 3D OBJECT," filed May 13, 2014, and U.S. Provisional Application No. 61/992,204, entitled "METHOD AND APPARATUS FOR SCANNING AND PRINTING A 3D OBJECT," filed May 12, 2014, the entire contents of each of which is incorporated herein by reference.

BACKGROUND

Mobile phones incorporate components that make them versatile and practically indispensable to their owners. Most existing smartphones include a camera and various inertial sensors, such as an accelerometer or compass. The smartphones can also include a proximity sensor, magnetometer, or other types of sensors.

Smartphones can be used to capture information with their cameras. Users value a smartphone's ability to take pictures because this feature allows the user to easily capture memorable moments or images of documents, such as might occur when performing bank transactions. However, smartphones are generally used to acquire images of simple scenes, such as a single photograph or a video with a sequence of image frames.

Heretofore, smartphones have not been used to produce output that can be printed to a three-dimensional (3D) printer. Such printers can be used to print a 3D representation of an object. However, a suitable 3D representation of an object has generally been created with specialized hardware and software applications.

SUMMARY

In some aspects, a method is provided for forming a 3D representation of an object with a smartphone or other portable electronic device. Such a representation may be formed by scanning the object to acquire multiple image frames of the object from multiple orientations. Information acquired from these image frames may be combined into a first representation of the object. That first representation may be processed to generate a second representation. In the second representation, the object may be represented by structural information, which may indicate the location of one or more surfaces, and texture information. The second representation may be modified, to remove or change structural information indicating structures that cannot be physically realized with a 3D printer.

In some embodiments, the second representation, and/or the modified second representation, may be a portable document format.

In some aspects, a method is provided for forming a 3D representation of an object with a smartphone or other portable electronic device. Such a representation may be formed by scanning the object to acquire multiple image frames of the object from multiple orientations. Information acquired from these image frames may be combined into a first representation of the object. That first representation may be processed to generate a second representation. In the second representation, the object may be represented by structural information, which may indicate the location of one or more surfaces, and texture information. The second representation may be used to generate a visual display of the object while the image frames are acquired.

In accordance with other aspects, any of the foregoing methods may be embodied as computer-executable instructions embodied in a non-transitory medium.

In accordance with yet other aspects, any of the foregoing methods may be embodied as a portable electronic device in which a processor is configured to perform some or all of the acts comprising the method.

One type of embodiment is directed to a portable electronic device comprising a camera and at least one processor. The at least one processor is configured to form a first representation of an object from a plurality of image frames acquired with the camera from a plurality of directions, the representation comprising locations in a three-dimensional space of features of the object. The at least one processor is further configured to determine, from the first representation, a second representation of the object, the second representation comprising locations of one or more surfaces. The at least one processor is further configured to modify the second representation to remove surfaces that are not printable in three dimensions store the modified second representation as a three-dimensional printable file.

In some embodiments, modifying the second representation to remove surfaces that are not printable in three dimensions comprises removing surfaces that are not joined to other surfaces to provide a wall thickness above a threshold. In some embodiments, modifying the second representation to remove surfaces that are not printable in three dimensions comprises removing surfaces that are not a part of a closed hull. In some embodiments, modifying the second representation to remove surfaces that are not printable in three dimensions comprises computing normals to surfaces to remove surfaces having a normal in a direction toward an interior of a hull.

In some embodiments, the portable electronic device further comprises one or more inertial sensors. In some embodiments, the at least one processor is further configured to form the first representation based on outputs of the one or more inertial sensors when the plurality of image frames is acquired.

In some embodiments, the portable electronic device further comprises a display. In some embodiments, the at least one processor is further configured to render an image of the object based on a first portion of the plurality of image frames while a second portion of the plurality of image frames is being acquired. In some embodiments, the three-dimensional printable file is in a portable document format. In some embodiments, the three-dimensional printable file comprises separate information about structure of the object and visual characteristics of the structure.

One type of embodiments is direct to a method of forming a file for printing on a three-dimensional printer, the file comprising a representation of an object. The method comprises acquiring a plurality of image frames using a camera of a portable electronic device, and while the image frames are being acquired, construct a first three-dimensional representation of the object, determine a second three-dimensional representation of the object, by calculating a convex hull of the object, and display a view of the second three-dimensional representation on a two dimensional screen.

In some embodiments, the method further comprises modifying the second three-dimensional representation to remove surfaces that are not printable in three dimensions. In some embodiments, modifying the second three-dimensional representation to remove surfaces that are not printable in three dimensions comprises removing surfaces that are not joined to other surfaces to provide a wall thickness above a threshold. In some embodiments, modifying the second three-dimensional representation to remove surfaces that are not printable in three dimensions comprises removing surfaces that are not a part of the convex hull. In some embodiments, modifying the second three-dimensional representation to remove surfaces that are not printable in three dimensions comprises computing normals to surfaces to remove surfaces having a normal in a direction toward an interior of the convex hull.

In some embodiments, constructing the first representation comprises constructing the first representation based on outputs of one or more inertial sensors of the portable electronic device when the plurality of image frames is acquired. In some embodiments, the method further comprises rendering an image of the object based on a first portion of the plurality of image frames while a second portion of the plurality of image frames is being acquired. In some embodiments, the three-dimensional printable file is in a portable document format. In some embodiments, the three-dimensional printable file comprises separate information about structure of the object and visual characteristics of the structure.

One type of embodiment is directed to at least one non-transitory, tangible computer-readable storage medium having computer-executable instructions, that when executed by a processor, perform a method of forming a three dimensional representation of an object from a plurality of image frames captured with a camera of a portable electronic device. The method comprises forming a first representation of the object from the plurality of image frames, the representation comprising locations in a three-dimensional space of features of the object, determining, from the first representation, a second representation of the object, the second representation comprising locations of one or more surfaces, modifying the second representation to remove surfaces that are not printable in three dimensions, and storing the modified second representation as a three-dimensional printable file.

In some embodiments, modifying the second representation to remove surfaces that are not printable in three dimensions comprises removing surfaces that are not joined to other surfaces to provide a wall thickness above a threshold. In some embodiments, modifying the second representation to remove surfaces that are not printable in three dimensions comprises removing surfaces that are not a part of a closed hull. In some embodiments, modifying the second representation to remove surfaces that are not printable in three dimensions comprises computing normals to surfaces to remove surfaces having a normal in a direction toward an interior of a hull.

In some embodiments, forming the first representation comprises forming the first representation based on outputs of one or more inertial sensors of the portable electronic device when the plurality of image frames is acquired. In some embodiments, the method further comprises rendering an image of the object based on a first portion of the plurality of image frames while a second portion of the plurality of image frames is being acquired. In some embodiments, the three-dimensional printable file is in a portable document format. In some embodiments, the three-dimensional printable file comprises separate information about structure of the object and visual characteristics of the structure.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 13A, 13B, 13C and 13D are schematic diagrams illustrating an exemplary process of scanning a document by acquiring a stream of images, in accordance with some embodiments of the invention;

FIGS. 14A and 14B are schematic diagrams of an example of adjusting a relative position of an image frame of an object being scanned by aligning the image frame with a preceding image frame, in accordance with some embodiments of the invention;

FIGS. 15A, 15B, 15C and 15D are schematic diagrams illustrating an exemplary process of capturing a stream of image frames during scanning of an object, in accordance with some embodiments of the invention;

FIGS. 16A, 16B, 16C and 16D are conceptual illustrations of a process of building a network of image frames as the stream of image frames shown in FIGS. 13A, 13B, 13C and 13D is captured, in accordance with some embodiments;

FIGS. 17A, 17B and 17C are schematic diagrams illustrating another example of the process of capturing a stream of image frames during scanning of an object, in accordance with some embodiments of the invention;

FIG. 18 is a conceptual illustration of a process of building a network of image frames as the stream of image frames shown in FIGS. 13A, 13B and 13C is captured, in accordance with some embodiments of the invention;

FIG. 20 is a representation of a 3D object in PDF language.

DETAILED DESCRIPTION OF INVENTION

Figure 1:
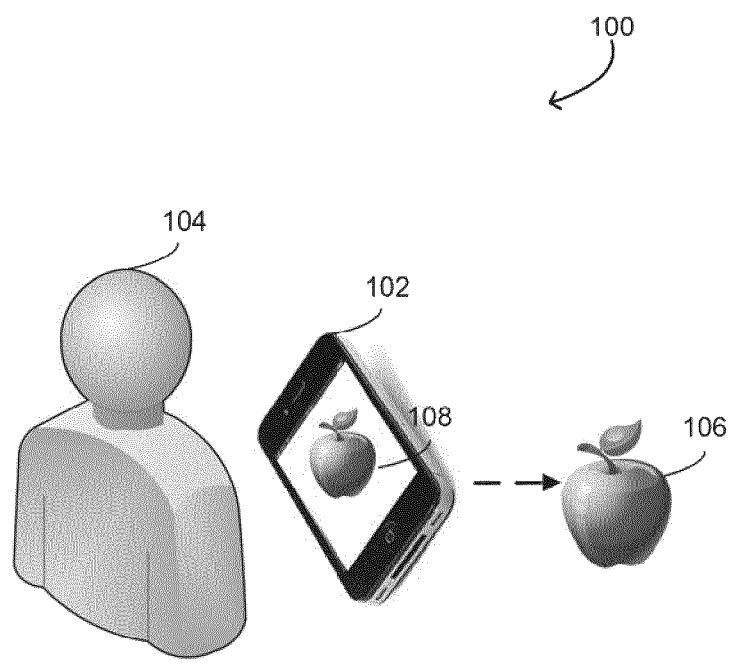
FIG. 1 is a sketch of a user operating a portable electronic device to form a three dimensional representation of an object.

The inventors have recognized and appreciated that a smartphone, or other portable electronic device, may be used to capture images of objects that can be printed on a three dimensional printer. Moreover, they have developed image processing techniques that enable such a smartphone, or other portable electronic device, to capture images of objects and to format those images for printing in three dimensions. These techniques may be based on constructing a composite image from multiple image frames of an object. The image frames may be collected such that different image frames represent different portions of the object or represent the object from different perspectives. In some embodiments, the multiple image frames may be from multiple perspectives such that they contain three-dimensional information about the object. In such embodiments, the composite image may be a three-dimensional representation of the object. That representation may include depth information, which may be captured using a camera, such as by accessing focus information.

Some of the techniques described herein are based on approaches for combining image frames captured with a smartphone, or other portable electronic device. In some embodiments, combining image frames may include identifying features within multiple image frames and determining coordinates of those features in a common three dimensional coordinate system. The orientation of each image frame within that coordinate system, and therefore the orientation of features appearing within the image frame, may be determined based on one or more types of information and/or one or more types of processing. In some embodiments, an initial position of each image frame, and therefore features within the image frame, may be computed. Additional information may be used to update the position estimate of each image frame and features within the frame.

In some embodiments, the initial position may be estimated using outputs of inertial sensors on the portable electronic device to determine the orientation of a camera on the device when an image frame was acquired. The initial position may also be estimated, in part, based on depth information with respect to the camera. Such depth information may be acquired from focus controls associated with the camera or in any other suitable way. The position estimates may be updated one or more times. In some embodiments, either the initial position or an update may be based on matching of corresponding features in image frames that, at least partially, represent the same portion of an object.

In some embodiments, position estimates alternatively or additionally may be updated based on a sequence of images in which non-sequential image frames are detected to represent the same portion of an object. The positions associated with these image frames, and intervening image frames in the sequence, may be updated.

Regardless of the amount of refinement of the initial position estimate, the result of such processing may be a set of features, represented as a "point cloud," in which each point may have coordinates in a three dimensional space. When information about depth of the points relative to the camera is included, this point cloud may serve as a depth map. Estimates of positional uncertainty may be associated with the coordinates. As more image frames are acquired, processing to update the point cloud with new information in the additional image frames may improve certainty for the coordinates.

When image frames capture a common feature from different views, points in the point cloud may provide three dimensional coordinates for features of an object. Sets of points, each set representing features extracted from an image frame, may be positioned within the depth map. Initially, the sets may be positioned within the depth map based on position information of the smartphone at the time the associated image frame was captured. This positional information may include information such as the direction in which the camera on the phone was facing, the distance between the camera and the object being imaged, the focus and/or zoom of the camera at the time each image frame was captured and/or other information that may be provided by sensors or other components on the smart phone.

Sets of points in different image frames, representing features in an object being imaged, may be compared in any suitable way. As each set of points is added to the depth map, its three-dimensional position may be adjusted to ensure consistency with sets of points containing points representing an overlapping set of features. In some embodiments, the adjustment may be based on projecting points associated with multiple image frames into a common frame of reference, which may be a plane or volume. When there is overlap between the portions of the object being imaged represented in different image frames, adjacent sets of points will likely include points corresponding to the same image features. By adjusting the three dimensional position associated with each set of points to achieve coincidence in the frame of reference between points representing the same features, accuracy of the coordinates of the points can be improved. As more image frames are gathered, the accuracy of the points in the depth map may be improved. When points corresponding to a particular feature or region of the frame of reference have a measure of accuracy exceeding a threshold or meeting some other criteria, those points may be combined with other sets of points having a similar level of accuracy. In this way, a coarse alignment of image frames, associated with the sets of points, may be achieved.

A finer alignment also may be achieved to further improve image accuracy and/or quality. As more image frames are gathered and additional sets of points are added to the depth map, the relative position and orientation of the sets of points may be adjusted to reduce inconsistencies on a more global scale. Such inconsistencies may result, for example, from errors in inertial sensor outputs that accumulate as the smart phone is moved back and forth, nearer and further from an object being imaged. Inconsistencies may also result from an accumulation of small errors in alignment of one set of image points to the next as part of the coarse alignment. A global alignment may occur when there is a series of image frames that begin and end at the same feature. Such a series of images may be detected as a loop and further processed to improve alignment of the series of images.

Regardless of the number and nature of alignment processes, processing circuitry may maintain an association between the points in the depth map and the image frames from which they were extracted. Once the relative position, orientation, zoom and/or other positional characteristics are determined with respect to a common reference for the sets of points, those points may be used to identify structural features of an object. Points may be grouped, for example, to represent structural features. The structural features may be represented as a convex hull.

The convex hull is an example of a representation of surfaces of the object. Other examples of ways to represent 3D objects include Poisson Surface reconstruction or advancing front meshing. By accessing the image frames associated with the points that have been grouped into a structure, texture information about the surfaces may be ascertained. Texture information, such as color, about the object may be determined from the image frames. The texture information of a particular feature may be determined from the region of the images that depict the feature.

Structures may be identified based on the point cloud in any suitable way, which may include filtering or other pre-processing. The depth map, for example, may be smoothed and/or filtered before determining a three-dimensional volume representing the object. As an example of filtering, a threshold value on the positional uncertainty may be used to select the points to include in the volume. Points having an accuracy level above the threshold may be included while points below the threshold may be discarded.

Smoothing may also be applied. Points that are clustered with other points, indicative of being on a common structure may be retained. Conversely, points that appear to be "outliers" may be discarded when identifying structural features. Moreover, the smoothing and filtering may be used together. A different threshold value for accuracy of a point to be retained may be used for a point that is in a cluster than for a point that is outside of any cluster.

Other information, such as texture, may be used in the filtering. In some embodiments, local threshold values may be applied to regions of the depth map that contain similar texture information. For example, points in the depth map corresponding to locations in an image frame where there is little texture information may be compared to a higher certainty threshold because such points are less likely to accurately correspond to a feature.

Regardless of how points are selected for inclusion in the smoothed model, the smoothed model may then be used to determine a convex hull defining the three-dimensional volume of the object. When displaying the composite image, the convex hull may be used to determine the structure of the object. Texture information from the image frame may be used to provide texture for surfaces represented by the convex hull.

In some embodiments, improvements in image quality may be achieved by processing portions of the composite image as it is being formed and using results of that processing to guide acquisition of image frames to complete the composite image. In some embodiments, image capture, processing and display as described herein may be performed within a smart phone or other portable electronic device. Accordingly, techniques as described herein to identify segments of the composite image of low quality may be executed in real-time—meaning that low-quality segments may be identified while the user is moving a smart phone to acquire an image of an object.

For scanning to form a three dimensional representation of an object, feedback may be provided to a user, enabling the user to identify in real time portions of the object of low quality that might be improved by additional data. In some embodiments, that feedback may be provided by rendering on a display a two dimensional representation of the object based on the model of the object constructed. For example, the three dimensional model may be stored in a format for which a two dimensional viewer is available.

As a specific example, information about structure and texture may be stored in a file in accordance with a portable document format that supports three dimensional objects. A two dimensional viewer for that portable document format may be used to provide feedback to a user of a portable electronic device being operated to collect images of the object.

Thus, rather than displaying on a screen associated with the portable electronic device images, the information displayed may represent the model of the object. In such an embodiment, a user may observe differences between the displayed model of the object and the actual object. Such differences may indicate to the user that further data is required for portions of the object. The user may allow the portable electronic device to continue to acquire image frames, providing more information from which processing may improve the quality of the object model. When the image quality appears suitable, the user may input a command that stops the portable electronic device from collecting further images. However, it should be appreciated that criteria to stop image collection may also be applied automatically. For example, an image processor may stop collection of additional image frames when a number of additional image frames do not change a number of clusters of points in a point cloud or otherwise add information about the object.

When image collection stops, the file, in the portable document format, may also be provided to a three-dimensional printer. In some embodiments, the file may be post-processed to ensure that it is suitable for three-dimensional printing. Such post-processing may include removing information that describes structures that cannot be printed by a three-dimensional printer. For example, post-processing may remove from the model representations of structures that have no width, surfaces with normals pointing towards the interior of a volume, or structures that, in accordance with the model, are floating in space.

Alternatively or additionally, post processing may add additional information to allow a suitable structure to be printed from the representation in the file. In some embodiments, the additions may deviate from the object as represented in the file, but may increase the likelihood that a usable object will be produced by the 3D printer. For example, support structures may be added to provide physical stability to the printed model or to support members that could be printed but might be very fragile as printed. For example, information defining thickness may be added to the representation of edges and/or lines to provide physical stability to objects that may result when the file is printed. Additionally or alternatively, a support base and/or internal support structures may be added to provide structural integrity to the printed model. The post-processed data also may be stored in the portable document format.

Turning to FIG. 1, an example of a system 100 to form a composite image is illustrated in which some or all of these techniques may be applied. In this example, image frames are captured using a smartphone 102. It should be appreciated that techniques described herein may be used with image frames captured with any suitable portable electronic device movable in three dimensions, and a smartphone is used only as an example of an image capture device.

As shown schematically in FIG. 1, smartphone 102 can be moved by a user 104 in three dimensions to acquire multiple image frames of an object 106. The multiple image frames can be captured from multiple orientations to acquire different views of object 106. The object may be a single item, such as a building, or may be a scene containing multiple items. Accordingly, the term "object" does not imply a limit on the nature of the content of an image.

In this example, the object 106 is an apple and the image frames are assembled into a composite image representing the object 106. Mobile device 102 may be controlled to display the composite image on a display 108 of the mobile device 102. In some modes, mobile device 102 may process image frames representing multiple views of the object, the image frames may be assembled into a three-dimensional representation of the object 106. Object 106 may be any suitable object that user 104 desires to image using smartphone 102. Object 106 may also be held by user 104 or located at a distance from user 104, and it is not a requirement that object 106 be placed on a surface. In this example, the object being imaged is three-dimensional and multiple image frames from different perspectives are needed to capture the surface of the object. A user 104 may move the smartphone 102 around object 106 to capture the multiple perspectives. Accordingly, in this example, smartphone 102 is being used in a mode in which it acquires multiple images of an object, such that three dimensional data may be collected.

Figure 2:
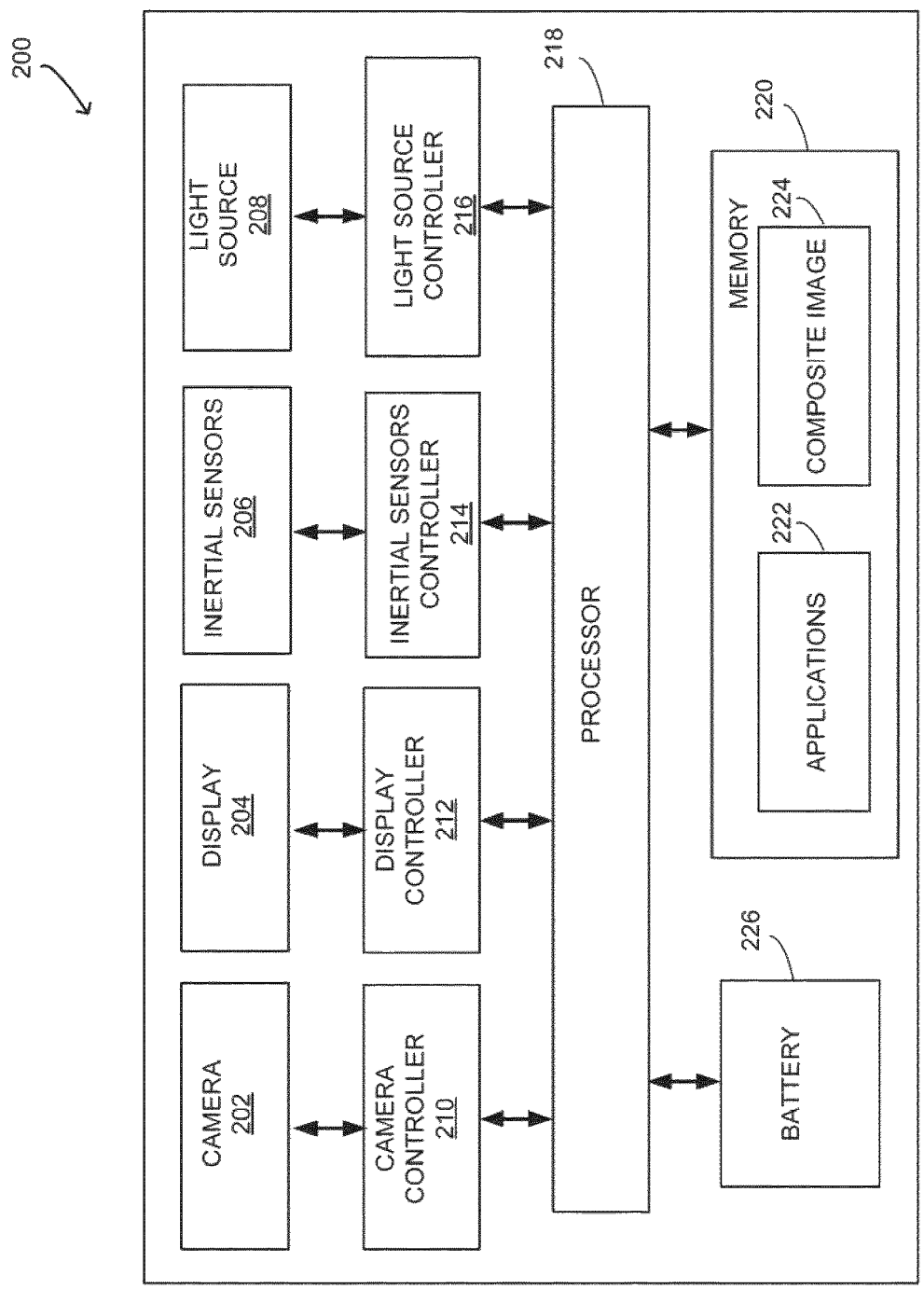
FIG. 2 is a block diagram of components of a portable electronic device that may capture a three dimensional representation of an object.

FIG. 2 illustrates components of a smartphone 200 (e.g., smartphone 102 in FIG. 1) which is an example of a portable electronic device that may be used to implement the described techniques. Smartphone 200 may include a camera 202, a display 204, one or more inertial sensors 206, and a light source 208. These and other hardware components of smartphone 200 may be implemented using techniques as are known in the art. Likewise, software controlling the hardware components may be implemented using techniques known in the art. Applications 222, however, may include computer-executable instructions that implement image acquisition and processing techniques as described herein.

Camera 202 may include an imaging sensor which may be any suitable type of sensor. Camera 202 may include a front-facing and/or a rear-facing camera, for example.

Light source 208 may be any suitable source of light, such as, for example, one or more light-emitting diodes (LED). Though, any other types of light source may be utilized or the light source may be omitted. Light source 208 may be controlled to be selectively switched on or off to control motion blur and other parameters.

The inertial sensors 206 may include an accelerometer that tracks relative motion of the smartphone from one image frame to another, a gyroscope that tracks relative motion of the smartphone during a period of time, a compass, an orientation sensor, and any other types of sensors that provide an output indicating a position, orientation, or motion of smartphone 200. Smartphone 200 may also include proximity sensors and other types of sensors.

Smartphone 200 may be moved in three dimensions in any suitable manner, and motion of the device can be detected using inertial sensors 206. In some embodiments, outputs of the sensors may be captured at times that are synchronized with capture of image frames. The outputs of sensors 206, thus, can be related to what the camera 202 was pointing at when an image frame was acquired. This information provided by the inertial sensors 206 and/or camera controller 210 may be used to determine the relative positions of what is depicted within image frames such that this information may be used to determine relative positions of image frames within a composite image.

Moreover, in accordance with some embodiments, in addition to relative dimensions, absolute dimensions may be recorded. This absolute dimension information may be achieved, for example, using camera information, such as focus information in combination with information about imaging angle and image array size. Such absolute dimensions may be used to reproduce the three-dimensional representation to an accurate scale when printed by a three-dimensional printer.

Display, or screen, 204 may be any suitable type of display adapted to display image frames as they are being captured by smartphone 200, information comprising feedback to the user and any other information. In some embodiments, display 204 may be an LED-backlit type of display—e.g., LED-backlit liquid crystal display (LCD) or any other type of display. Display 204 may be a touch screen displaying various icons and other controls that a user can touch or manipulate in any other manner (e.g., using gestures). In some operating modes, display 204 may display, in a manner that is perceived to a user as a continuous live view, image frames of the object being imaged by camera 202, provide user feedback with respect to controlling imaging conditions and receive user input for controlling operation of smartphone 102 while capturing images of the object. In addition, display 204 may include buttons and other components that are adapted to receive user input.

In other operating modes, the display may contain a view of the object generated from a three-dimensional model of an object being imaged. In some embodiments, the composite image and the three-dimensional model may be generated from the same underlying data set derived from captured image frames. As described herein, that data set may be a "point cloud" representing multiple points at which features were detected in image frames in an acquired sequence of image frames. The data set for generating a three-dimensional representation may be augmented by texture information and/or depth information or any other suitable type of data.

Operation of each of camera 202, display 204, inertial sensors 206 and light source 208 may be controlled via one or more controllers. In the example illustrated in FIG. 2, smartphone 200 includes a camera controller 210, a display controller 212, a motion controller 214, and a light source controller 216. These controllers may be implemented using circuitry or other suitable components as are known in the art. Though, it should be appreciated that these controllers are shown by way of example only, as any type and number of controllers may be included in smartphone 200 and the described techniques are not limited to a particular implementation of the smartphone. Moreover, the smartphone may comprise any other controllers, such as a video, audio controller (e.g., multimedia audio controller), and other types of controllers, which may be separate controllers or part of any of the controllers described herein.

Operating parameters of camera 202, display 204, inertial sensors 206 and light source 208 may be controlled via respective controllers adapted to transmit control signals to the devices. For example, operating parameters of camera 202, such as the focal length, auto-focus, exposure time, and others, may be controlled via camera controller 210. Such a camera controller may be implemented using circuitry as known in the art or in any other suitable way. These controllers may receive commands from processor 218 and provide control signals, which implement the command, to associated components. Alternatively or additionally, the controllers may provide information indicating the state of their associated components.

Light source 208 may be controlled, via controller 216 or other controller (e.g., a controller that controls operation of both camera 202 and light source 208), to operate in synchronization with camera 202. Light source 208 may be, for example, LED-based light source (e.g., LED "flash") or other type of light source. The operating parameters of camera 202 and light source 208 may be controlled so that smartphone 200 may be used to capture images in various environments with different lighting conditions, including indoors, outdoors at different times of the days, such as at dusk or dawn, and at direct daylight. In some embodiments, light source 208 may be controlled to operate in a "torch mode," which is an operating mode that allows keeping the light on while capturing images. In this way, light source 208 may allow taking pictures in low light conditions. In some scenarios, operating parameters of light source 208 may be controlled by the user. However, in some embodiments, an application executing on processor 218 may determine and/or send commands to control operating parameters of any one or more components.

Controller 214 may be used to control operation of inertial sensors 206, including acquiring values from these sensors. Though a single controller is shown, it should be appreciated that different inertial sensors (e.g., an accelerometer, a gyroscope, etc.) may have separate controllers.

Operating parameters of display 204 may be controlled via display controller 212 to display image frames captured by smartphone 200 and any other information. In some embodiments, information presented on display 204 may provide real-time feedback and user guidance. For example, display 204 may be controlled to provide visual guidance to the user with respect to a manner of obtaining the next image frame in the stream of image frames being captured. When the smartphone is operated to image an object, display 204 may provide a live camera view showing a live feed from camera 202 and/or may provide a representation of a three-dimensional model as it is being constructed from multiple image frames. Controller 212 may also acquire user input, such as input that may be entered through a touch-sensitive display.

Smartphone 200 also comprises circuitry for performing processing. In this example, that circuitry includes a processor 218 and a memory 220 coupled to processor 220. Memory 220 may be encoded with computer-executable instructions. Memory 220 may be implemented as at least one computer-readable storage medium that may retain information for a sufficient time to provide the computer-executable instructions in a non-transitory form. As used herein, the term "computer-readable storage medium" encompasses a computer-readable medium that can be considered to be a manufacture (i.e., article of manufacture) or a machine.

The computer-executable instructions may be in many forms, such as applications, or program modules, executed by one or more processors, such as processor 218. Processor 218 may comprise circuitry for executing computer-executable instructions.

The computer-executable instructions stored in memory 220, when executed by processor 218, may implement the described image processing techniques. As shown in FIG. 2, memory 220 may store one or more applications 222 for controlling smartphone 200 to implement the described image processing techniques. Applications 222 may comprise one or more modules for image processing, analysis, and forming a representation of an object by combining multiple image frames. Applications 222 may include three-dimensional data content modules, motion estimation modules, various modules for image pre-processing, modules for reflection and shadow detection, etc. In some embodiments, the three-dimensional content is stored in a data format that can be read by a three-dimensional visualization application. Such a data format may be a 3D Portable Document Format ("PDF") and the three-dimensional visualization application may include a PDF viewer for displaying the 3D PDF on a two dimensional display screen. Additional data format conversion modules may be included to change the format of the three-dimensional content. Such conversion modules may change the three-dimensional content into a data format that may correctly print, by a three-dimensional printer, the three-dimensional content as a physical model. Some or all of these modules may be executed locally on the smartphone, independently from any Internet connection. Though, some of the modules may interact with servers or other remote computing devices such that some or all of the processing described herein may be performed on those remote computing devices.

In the illustrated example, memory 220 may represent one or more types of memory, which may be implemented using multiple types of memory components. Applications 222, for example, may be stored in a non-volatile portion of memory 220. A volatile portion of memory 220 may store other types of data. For example, memory 220 may also store a composite image 224 formed in accordance with the described techniques, and any other related information, such as information on motion of the smartphone collected from inertial sensors 206, information obtained as a result of image processing—e.g., results of three-dimensional content processing, and any other information. Moreover, a composite image once formed may be moved from volatile to non-volatile memory.

Further, it should be appreciated that memory 220 may store any other applications that can be executed on the smartphone. The applications may be downloaded and stored in memory 220, accessed over a network, or received in any other manner. One or more of applications 222 may be third-party applications supported via one or more application programming interfaces. Such third party applications and/or application programming interfaces may support PDF documents and/or any suitable 3D printer drivers. Memory 220 may also store an operating system executed by processor 218.

FIG. 2 further shows that smartphone 200 comprises battery 226. It should be appreciated that smartphone 200 may comprise any other components not shown herein for the sake of brevity, such as wireless communication circuits, input/output components, and any other type of components. Further, the specific components illustrated are exemplary of the types of components that may be included in a portable electronic device to achieve one or more functions. For example, though battery 226 is illustrated, any suitable power source may be present.

Figure 3:
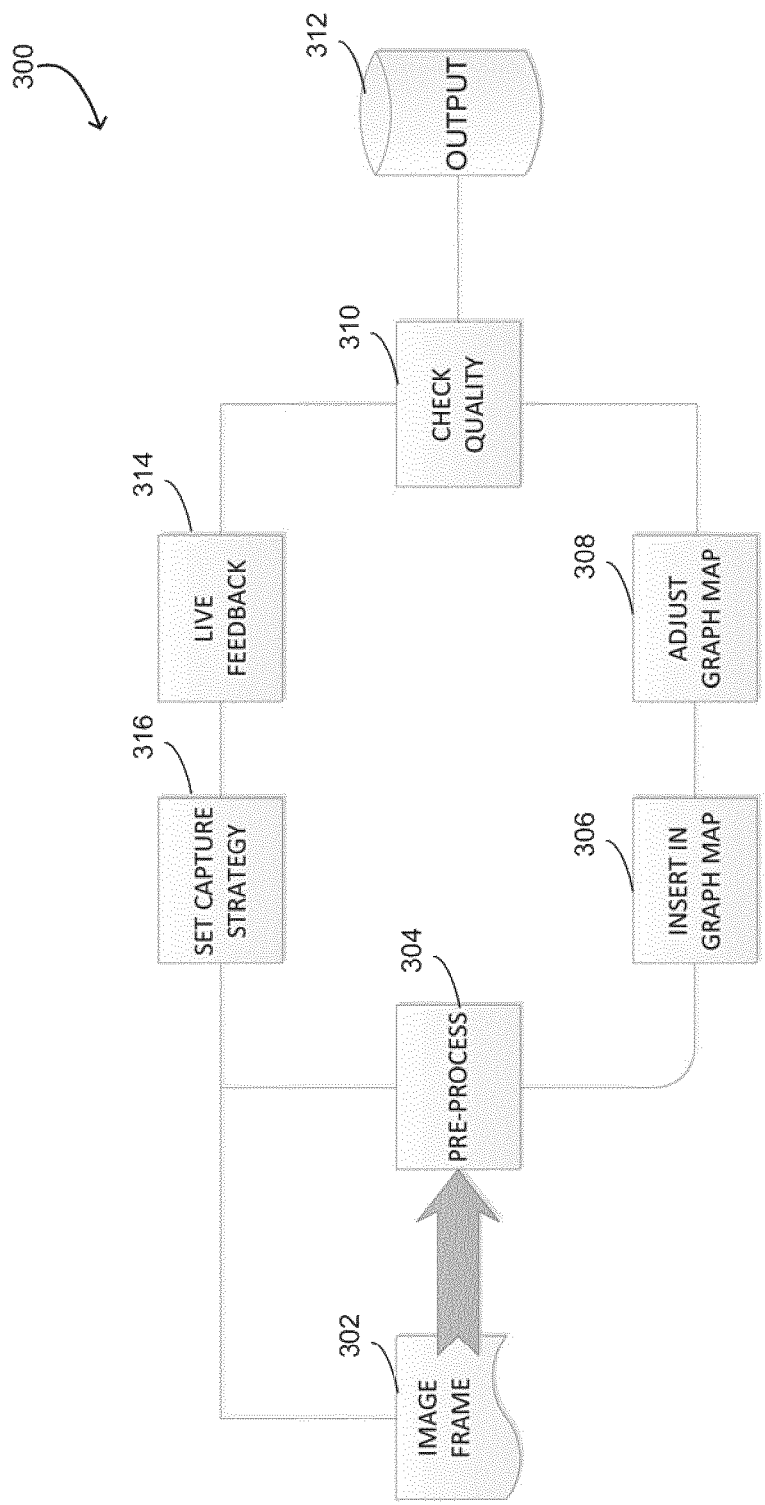
FIG. 3 is a schematic diagram of processing of image frames that includes forming a composite image captured as an object is being imaged, improving quality of the composite image, and providing feedback to a user, in accordance with some embodiments.

FIG. 3 illustrates steps of a real-time processing 300 of image frames to form a composite image or other representation of an object. The processing in FIG. 3 is illustrated to include a feedback loop in which processing to improve image quality is performed. In some embodiments, one or more of the illustrated techniques to improve image quality may be used. In this example, multiple types of feedback may be used. Feedback may be generated to guide a user in positioning the smartphone in a way that captures additional views of the object and/or improves image quality. Alternatively or additionally, feedback may be provided to controllers in the smartphone 200 to impact the conditions under which subsequent images are captured. Alternatively or additionally, feedback may be provided to a component that assembles image frames into a composite image, to influence the construction of the composite image.

The processing may be implemented on a portable electronic device, such as smartphone 200 programmed in accordance with techniques as described herein. Smartphone 102 (FIG. 1) may have multiple operating modes. Different applications, different modules or different portions of an application or module may execute to implement each mode. The selection of a mode may be made based on user input or other conditions that can be detected by processing on smartphone 200. In some embodiments, processing in different modes may be based on a common data set or format. However, in some embodiments, the different modes may operate completely independently.

In the operating mode illustrated in FIG. 3, a new image frame 302 may be captured as part of process 300 using a camera, such as camera 202 (FIG. 2). Image frame 302 may be acquired as part of acquiring a stream of images that are captured as the camera is being pointed towards an object. The captured image frames may be used to render a display in any suitable way. For example, smartphone 200 may operate in a video mode during which image frames are continuously captured and a live view comprising the image frames is displayed to the user. Alternatively or additionally, smartphone 200 may operate in a 3D printing mode in which a representation of an object, suitable for printing on a 3D printer is acquired.

These captured image frames may be stored in memory for processing and/or later display. The number of image frames stored, and which specific image frames are stored, may also depend on user input. In response to one type of user input, for example, a single image frame may be recorded as a still image. Alternatively, multiple image frames in the sequence may be recorded for combining into a composite image of an object.

To capture image frame 302, a user may point smartphone 102 at an object desired to be imaged. Smartphone 102 may then initiate a process of storing in memory image frames acquired from the camera upon a user instruction or automatically. For example, a button may be pressed or a visual feature (e.g., an icon) may be manipulated to instruct smartphone 102 to obtain image frames representing an object. Accordingly, though FIG. 3 shows capture of a single image frame 302, the depicted processing may be used to capture a sequence of image frames. One or more aspects of the image capture process may be adjusted over time as successive image frames in the sequence are captured.

Smartphone 102 may be positioned in any suitable orientation with respect to the object and may be held at any suitable distance from the object, as embodiments are not limited to any specific way a user positions and moves the smartphone to scan an object. The object may be of any suitable size, as the described techniques allow obtaining images of objects of different sizes, including large objects, by scanning multiple portions of such objects to capture respective multiple image frames and combining the image frames into a composite image representing an image of multiple portion of the object or the entire object.

Along with acquiring image frame 302, position information for the smartphone at a time when an image frame was taken may be determined based on outputs of the inertial sensors of the smartphone (e.g., inertial sensors 206 in FIG. 2) or in any other suitable way. As the smartphone is moved to capture images, the inertial sensors may measure position, orientation, and velocity (i.e., direction and speed of movement) of the smartphone. This information may be used to position image frame 302 within the composite image.

As shown at block 304, acquired image frame 302 may be pre-processed to prepare image frame 302 for further analysis. This may comprise improving quality of image frame 302. The pre-processing 304 may also include analyzing content of image frame 302 to extract features and obtain one or more parameters. Non-limiting examples of the features may comprise lines, edges, corners, colors, junctions and other features. Parameters may comprise sharpness, brightness, contrast, saturation, exposure parameters (e.g., exposure time, aperture, white balance, etc.) and any other parameters. Such parameters may include texture information associated with surfaces of the object at locations near the features.

In some embodiments, the pre-processing 304 may involve analyzing the image frame to determine whether the image frame is suitable for further processing. This determination may be done as a preliminary analysis, before a quality of the image frame is improved to prepare it for being inserted into the composite image. If one or more of the parameters obtained by processing image frame 302 indicate that the quality of the image frame is below a quality required for further processing, image frame 302 may be excluded from further analysis.

In some embodiments, features extracted from image frame 302 may be used to determine a sharpness of the image represented in the image frame which describes the clarity of detail on the image (e.g., a contrast along edges in the image). It may be determined whether the sharpness of the image is below a certain threshold value that may be selected in any manner. If the sharpness of the image is below the threshold, the image frame may be discarded.

Furthermore, if a shutter speed of the smartphone camera is slow and the exposure is therefore excessive, the image in image frame 302 may have a poor quality—e.g., may be blurred. Image frame 302 may be excluded from further analysis if it is of an unacceptable quality.

The pre-processing 304 may comprise determining whether to use the acquired image frame in constructing a composite image and/or a three-dimensional representation of an object. This determination may be made based on, for example, an amount of movement of image frame 302 relative to a preceding image frame. This may be determined based on matching the succeeding image frame 302 and the preceding image frame using respective features of the image frames and motion information associated with each of the image frames, to determine an amount of overlap between the image frames.

The motion information may be obtained using measurements collected by the inertial sensors (e.g., an accelerometer, a gyroscope, etc.) of the smartphone. The motion of the succeeding image frame may be determined as a relative motion with respect to a preceding image frame or as an absolute motion with respect to a reference image frame (e.g., a first image frame in the stream of image frames).

If the amount of movement is within a certain range (e.g., in some embodiments, less than 50%), image frame 302 may be used in building the composite image. However, the amount of movement that is above a certain threshold value (e.g., in some embodiments, greater than 50% relative to a prior image frame) may be taken as an indication that the smartphone is moved out of a certain range within a distance from a position at which a preceding image frame was captured and a position at which the succeeding image frame was captured. In this case, the image frame may be discarded. As with other processing steps disclosed herein, similar processing may be performed, regardless of the end use of the image information. For example, though described in connection with building a composite image, such processing may be performed in connection with building a depth map for generating a 3D representation of an object.

Furthermore, if the amount of movement of the image frame is below a threshold value (e.g., in some embodiments, less than 2%), it may be taken as an indication that the smartphone was not moved from a time when the preceding image frame was captured and a time when the succeeding image frame was captured. If it is determined that the succeeding image frame was not displaced relative to the preceding image frame and is therefore a redundant image frame, the succeeding image frame may be discarded. It should be appreciated that acceptable threshold amounts used to determine an absence of movement or an excessive amount of movement may be selected in any suitable manner and may vary in different embodiments.

Regardless of the way in which it is determined whether image frame 302 is to be discarded or whether it can be used further, image frame 302 may be discarded if it is determined to be not acceptable for further processing (not shown in FIG. 3). If it is determined that image frame 302 is of an acceptable quality for further processing, a quality of image frame 302 may be improved before inserting the image frame into the composite image.

Because the smartphone may acquire image frames representing the object at different orientations as the user moves the device in three dimensions, rotation of image frame 302 relative to a prior image frame may be detected. The pre-processing 304 may involve unrotating features in image frame 302 or otherwise translate the image frame into another frame of reference such that the new image frame 302 is presented in the same frame of reference as the prior image frame. Such a translation may occur, for example, if the camera is moved closer or further form the object being imaged between successive image frames.

In some embodiments, the pre-processing 304 may also comprise improving quality of image frame 302 by performing undistortion of an image represented in image frame 302 to correct for lens distortion, correcting for warping of the image, smoothing the image, correcting for white balance and performing any other suitable processing of image frame 302.

Next, pre-processed image frame 302 may be inserted (306 in FIG. 3) into a data structure representing the object being imaged. In some embodiments, the data structure may be a graph map, which may be stored in computer memory representing relative positions of image frames that have been captured. The graph map may be combined with image frames to assemble a composite image. Alternatively or additionally, the graph map may contain depth information and may serve as a depth map, which may be converted to a three dimensional representation of an object.

A representation of the object being imaged may be maintained and updated in the memory of the smartphone (e.g., memory 220 in FIG. 2) as multiple image frames are combined. In some embodiments, the graph map may be used to generate a composite image such that, when an image is displayed, it is rendered from the graph map in conjunction with other information indicating which portions of the graph map are to be displayed. In other embodiments, a composite image may be stored as values for pixels in an image, which may be directly rendered on a display, or in any other suitable format. Alternatively, as each new image frame is integrated into a data structure, it may change the values associated with the pixels. Accordingly, insertion of an image frame into the data structure may be performed in any suitable way, including by integrating visual information acquired from the image frame into a representation of the composite image or a data structure from which the composite image is rendered or three dimensional representation of an object is generated.

In some embodiments, preprocessing may determine whether to insert an image frame into the data structure. For example, image frame 302 may be inserted into the data structure when image frame 302 overlaps to an acceptable degree with a prior image frame. The prior image frame may be an image frame immediately preceding the succeeding image frame 302 or other prior image frame.

Image frame 302 may be combined with other image frames in the data structure based on the features identified for the image frame which may be extracted during the pre-processing 304. The features, combined with positional data determined for image frame 302, may be represented as points in a three dimensional point cloud. Processing circuitry of the smartphone may maintain an association between the points in the cloud and image frame 302 from which they were extracted.

In some embodiments, described in more detail below, image frame 302 may be represented as a set of points in the point cloud and may be initially positioned within the point cloud based on the position information of the smartphone at the time image frame 302 was captured. Image frame 302 may be positioned within the point cloud based on a position of a prior image frame within the point cloud.

Once image frame 302 is inserted into the data structure, such as a graph map, the data structure including the image frame may be adjusted, as shown at block 308 in FIG. 3. The adjustment may comprise processing a composite image rendered from the data structure to improve its quality. Any one or more techniques may be applied at block 308 to adjust the graph map storing the data representing the composite image.

The adjustment at block 308 may be based on projecting points associated with multiple image frames in the point cloud to a common frame of reference, which is some embodiments may be a reference plane or may include depth information and may be a reference volume. When the portions of the object being imaged represented in different image frames overlap, adjacent sets of points may include points corresponding to the same image features. The three dimensional positions of sets of points may be adjusted so that the points representing the same features overlap in the frame of reference. In this way, a coarse alignment of image frames, associated with the sets of points, may be achieved.

Accordingly, image frame 302 may be coarsely positioned by matching the set of points representing the image frame with respect to one or more sets of points representing previous overlapping image frames (e.g., image frames captured prior to the current image frame).

The quality of the composite image may be further improved by a finer alignment of the sets of points each representing an image frame in the point cloud. Such finer adjustment may be performed to reduce inconsistencies based on "global" positioning of image frames. Global positioning may involve positioning an image frame within the composite image based on positioning of image frames beyond the immediately preceding image frame. The finer alignment may involve adjusting relative position and orientation of the sets of points to reduce inconsistencies resulting, for example, from errors in inertial sensor outputs that accumulate as the smartphone is moved back and forth, nearer and further from the object being imaged.

Inconsistencies may also result from an accumulation of small errors in alignment of one set of image points to the next as part of the coarse alignment. As a set of points extracted from each incoming image frame are added to the point cloud by coarsely positioning the set relative to prior image frames, an image frame may become aligned to more than one prior image frame. The stream of image frame may be thus taken as closed in a "loop." When the "loop closing" is detected, an inconsistency between the position of the image frame in different alignments may exist. The fine alignment may reduce this inconsistency to achieve a more accurate mapping between the image frames.

Further improvement of the quality of the data collected for subsequent processing may be achieved by using image fill techniques that allow avoiding distracting features in the composite image. For example, a user finger, which may appear on an image of an object being held by a user, may be removed from the image and a corresponding area may be filled with content similar to that in other areas of the image.

It should be appreciated that the quality of the data set used for forming a composite image or other representation of an object may be improved in various other ways, including by selecting which image frames or portions of image frames to use in rendering a composite image. In some embodiments, processing at block 308 may entail identifying portions of the data captured from a sequence of image frames to omit from the composite image or to replace with other data. As an example, processing at block 308 may identify that the object being imaged includes undesirable items. Portions of image frames depicting those undesirable items may be removed or replaced in the composite image. As a specific example, in the scenario illustrated in FIG. 1, user 104 may be holding apple 106 with a finger. That finger may appear in the composite image, but processing at block 308 may remove it from the composite image.

Accordingly, after the graph map is adjusted at block 308, process 300 may follow to block 310 where the quality of the composite image may be checked and improved. This may be performed in real-time, as image frames of the object being scanned are being captured. The process of quality checking and improving may comprise identifying areas of different quality in the composite image. This may include selecting from among multiple image frames to provide details of one or more segments of the composite image. In some embodiments, techniques may be employed to identify relative quality levels of image frames from which information about the same segment may be obtained. Using relative quality information, information from one or more of multiple image frames representing the same segment may be identified and used in rendering the composite image.

Image quality as it relates to an overall image or one or more image frames combined into a composite image may be determined in any one or more suitable ways. In some embodiments, image frames used in rendering a composite image are stored in memory such that each can be separately processed or adjusted before being used to render the composite image. However, there is no requirement that the processing at block 310 be performed on entire image frames or single image frames. Any suitable portion of the image data acquired may be processed to determine image quality and adjusted to improve image quality.

Next, process 300 may provide at block 312 an output. The output, for example, may be a composite image directed to a display of the portable electronic device such that, as the composite image is constructed and adjusted, the evolving image will be displayed in real-time to a user. Though, other uses may be made of the output. For example, the composite image may be stored in memory of the smartphone (e.g., memory 220 in FIG. 2). The composite image may be rendered on the display of the smartphone in any suitable manner and may be updated and adjusted as scanning of the object progresses. Regardless of the number and nature of alignment processes, processing circuitry may maintain an association between the points in the point cloud and the image frames from which they were extracted.

Once an image of the object is completed, the image may be used in any suitable way. For example, it can be displayed, stored in the memory of the smartphone, printed out, transmitted via a network (e.g., in the email message), provided to an application, shared with other smartphones (e.g., via wireless image sharing), and used in any other manner.

Forming the composite image in accordance with some embodiments may include analyzing portions of the composite image as it is being formed and using results of the analysis to guide acquisition of further image frames to complete the composite image. Accordingly, as shown in FIG. 3, process 300 may include providing a real-time ("live") feedback (314) to the user of the smartphone. In some embodiments, processing at this block may entail presenting a representation of a three-dimensional model built of an object being imaged so that the user may observe where the model deviates from the real object being imaged. Generating such real-time feedback may entail filtering and/or smoothing data representing the object to define a volume representation of the object and displaying a two-dimensional image of the volume representation.

Alternatively or additionally, one or more techniques may be used to automatically analyze a three dimensional model to identify segments of the data set of low quality. Low quality segments may include segments where there is insufficient data from image frames to accurately determine structural or textural characteristics of an object and/or segments for which the points in a point cloud have, in the aggregate a certainty below a threshold such that the structure cannot reliably be identified for that segment. However, any other suitable automated image processing techniques may alternatively or additionally be used to identify segments for which additional data may be required.

The accuracy of such segments may be improved by prompting the user to acquire additional image frames of those segments. This real-time identification of low-quality segments may be used to render a display indicating to the user areas of the object that should be imaged again to improve image quality. Such areas may be indicated to the user in any suitable manner. For example, a colored frame may be displayed emphasizing the area that needs to be reimaged.

Additionally or alternatively, it may be indicated to the user in a suitable manner in which way to position the smartphone to capture additional images of an object being imaged. For example, in accordance with some embodiments described herein, a three dimensional model of an object may be stored as separate structure and texture information. A two dimensional view, derived from this model, may be presented to a user on a display screen on or associated with a portable electronic device used in capturing images. The user may then observe whether the model describes an object that looks like the real object. If not, the user may continue to acquire image frames of the object, particularly of portions that do not look correct in the displayed representation. Alternatively or additionally, automated processing of the model may identify areas for which the model contains a description of surfaces and/or texture that is not physically realizable (for example using techniques as are described herein for identifying portions of an object that are not printable). These areas may be translated into position information indicating where additional image frames should be captured to provide additional information on the not realizable portions of the model. That position information may be output to the user to alter the orientation of the smartphone to avoid reflections or other image artifacts. Such position may indicate a direction or orientation of the smartphone to avoid creating image artifacts.

As another way of providing feedback, process 300 may comprise controlling settings of hardware that capture subsequent image frames. FIG. 3 shows that process 300 includes setting capture strategy for a next image frame in the stream of image frame, shown by block 316 in FIG. 3. Setting the capture strategy may include adjusting one or more operating parameters of one or more hardware components of the smartphone, such as camera 202, display 204, inertial sensors 206, light source 208 and any other component which can be controlled to operate to capture images of the imaged target. As a specific example, commands may be sent to camera controller 210 to adjust the zoom or focus of the camera. Each of these hardware components may be controlled via a corresponding controller—e.g., controllers 210, 212, 214 and 216 in FIG. 2—or any other type of controller.

Alternatively or additionally, process 300 may entail adjusting processing of one image frame based on a prior image frame. In the example of FIG. 3, feedback is shown provided to pre-processing block 304. This feedback, for example, may be applied to select parameters to adjust during pre-processing or the amount of adjustment of one or more parameters.

Figure 4:
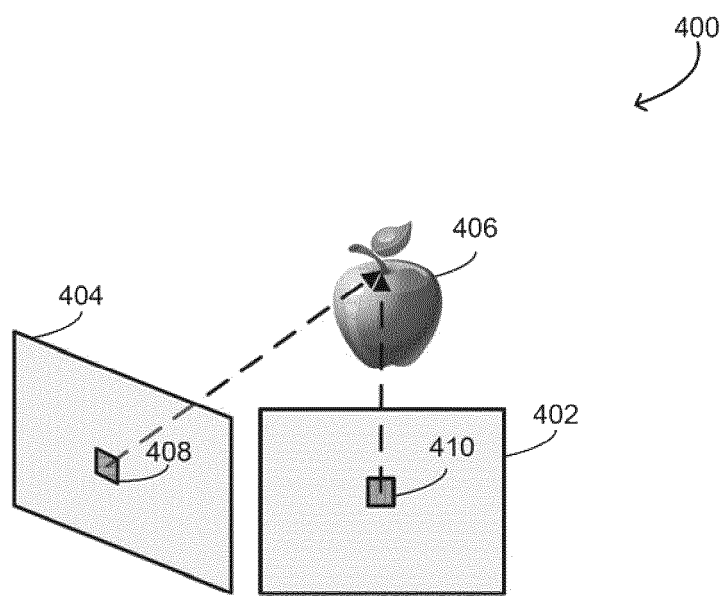
FIG. 4 is a sketch of capturing, from different perspectives, multiple image frames of the same region of an object which can be used to determine three-dimensional information by implementing techniques as described herein.

FIG. 4 is an example of processing within a system 400 to form a data structure containing a three-dimensional representation of an object 406. In this example, image frames 402 and 404 are captured using a smartphone, such as smartphone 102 in FIG. 1. The smartphone is moved to capture different perspectives of object 406 by changing the orientation and position of the smartphone with respect to the object. In this example, image frames 402 and 404 having different orientations and positions to capture different perspectives of object 406.

As shown schematically in FIG. 4, the two image frames 402 and 404 capture a similar feature of object 406. Similar features may be identified by automated processing by, for example, having similar texture in similar locations. Pixels 408 and 410 of image frames 402 and 404, respectively, capture the same region of a feature. Although each image frame captures a two-dimensional image frame of the object, the two image frames combined with camera parameters may be used to determine a distance between the object and the smartphone. The camera parameters may include focus, motion, and/or positional information of the camera, which may be used to determine a distance between the two image frames. The distance between the two image frames and the location of the similar feature in the image frames may be used to determine depth information. Such depth information may be an estimate of the distance between the object and the smartphone's position when capturing one of the image frames.

A probabilistic approach may be used to determine a depth estimate. When such a technique is used, a measure of confidence of the depth estimate may be determined. A depth estimate with a high probability may indicate a high measure of confidence in the accuracy of the depth estimate. Although only two frames are shown in FIG. 4, more frames may be used to determine depth information with respect to the smartphone. In some instances, including more image frames that capture the same feature in determining a depth estimate may improve the measure of confidence and reduce the uncertainty associated with the depth estimate.

Figure 5:
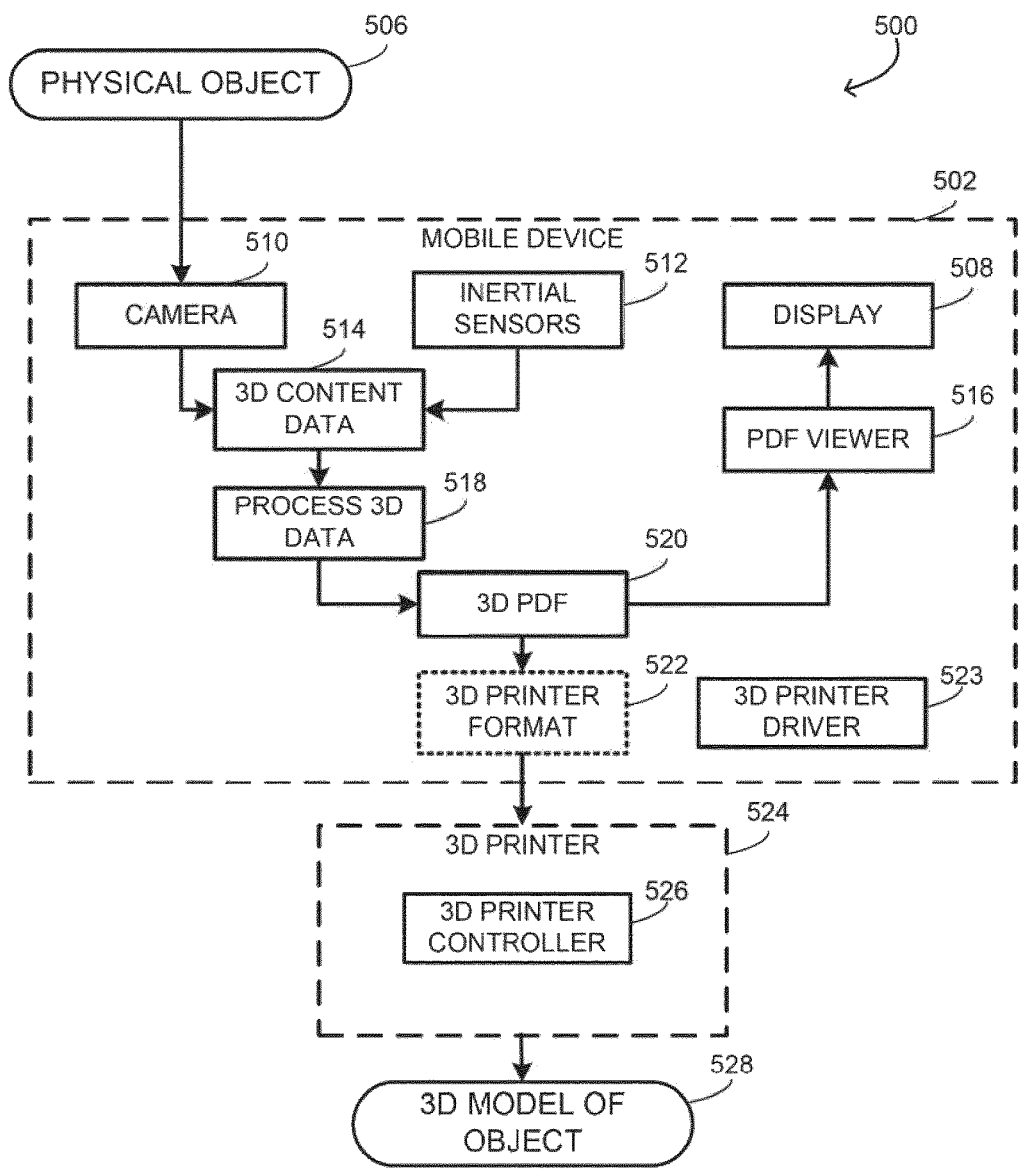
FIG. 5 is a block diagram of components of a portable electronic device and a three-dimensional printer in which some embodiments of the invention may be implemented.

FIG. 5 is a schematic of a system 500 that includes components that may be involved in acquiring, storing, visualizing, and printing three-dimensional information of a physical object 506. The object may be any object which can be imaged as the smartphone is moved in the three-dimensional space. A physical object 506 may be scanned using a camera 510 on a mobile device 502. During the scanning process, multiple image frames may be acquired that capture 3D content data 514 of the physical object 506. The multiple image frames may be taken from multiple perspectives or views to improve the accuracy of the 3D data of the object. The mobile device 502 may be moved in three-dimensions in any suitable manner to position the camera 510 and capture image frames of different perspectives of the physical object 506.

As the mobile device 502 is moved, motion and/or position information of the smartphone may be acquired by inertial sensors 512 of the mobile device 502. The inertial sensors 512 may include an accelerometer that tracks relative motion of the smartphone from one image frame to another, a gyroscope that tracks relative motion of the smartphone during a period of time, a compass, an orientation sensor, and/or any other types of sensors that provide an output indicating a position, orientation, or motion of mobile device 502. The outputs of sensors 512, thus, can provide an indication of what the camera 510 was pointing at when an image frame was acquired. This information provided by the inertial sensors 512 may be used to determine the relative positions of what is depicted within image frames such that this information may be used to determine relative positions of image frames within the three-dimensional content data.

In some embodiments, features identified in image frames acquired by camera 510 and motion parameter outputs from the sensors 512 may be used to determine three-dimensional coordinates of the features. As image frames are acquired during the scanning of the physical object, more features may be identified and three-dimensional coordinates are included in the three-dimensional content data 514 for the object. The three-dimensional content data may also include accuracy values of the three-dimensional coordinates and/or texture information.

An accuracy value may indicate a level of uncertainty of a three-dimensional coordinate and may be used in determining whether the coordinate is included in forming a composite image or representation of the object. The accuracy values, for example, may be computed based on a distribution of points in a point cloud and may represent the certainty or likelihood that a point accurately represents a feature of an object. If a feature is shown in multiple image frames, and the positional value of the point as determined from each frame is consistent, the accuracy value may be relatively high. Conversely, if the corresponding points in different image frames have different coordinates, the accuracy value for the combined point may be relatively low. Likewise, if depth measured from correlating multiple image frames corresponds to a depth as measured based on camera focus parameters, the accuracy value may be relatively high.

As part of capturing the 3D content, a scale of the object may be determined by analyzing the image frames, camera focus information and/or outputs of the inertial or other sensors. The scale may be an absolute scale of the object. Scale information may enable any output representing the object to be to scale.

The 3D content data 514 may be processed, in module 518, in any suitable way to generate data suitable for rendering by a visualization program and/or suitable for printing by a 3D printer 524. In the embodiment illustrated. processing in module 518 may convert the 3D content data 514 to a file 520 in a 3D portable document format. That conversion may entail generating from 3D content data 514 structural information about an object, such as identifying surfaces that define the object. Separately, texture information for the surfaces may be generated and stored.

Processing in module 518 may entail identifying clusters of points in a point cloud that represent surfaces. Such processing may include de-noising and/or filtering of the 3D content data. Then, points of the point cloud within the 3D content data 514 may be connected to form surfaces defining a volume representative of the scanned object.

Texture may be associated with those surfaces. The texture information may be obtained from analysis of image frames that depict portions of an object being imaged. Those image frames may be selected based on clusters of points in a point cloud deemed to represent surfaces. Such texture information may include information about the spatial arrangement of color and/or intensities. The texture information may correspond to locations of specific features and/or three-dimensional coordinates. Such texture information may be acquired from an image frame depicting those locations. In some embodiments, a representation of surfaces of the object may be defined from the three-dimensional coordinates of points in a point cloud, and texture information may map to points on the surfaces.

The surfaces and the texture information may then be used in creating a representation of the object that can be displayed and/or printed. This representation may be stored in a format form which it may be rendered in a display, to provide feedback to a user, and in which it may be provided to a 3D printer. Within the structure of a PDF file, the processed 3D data may be stored in an object as a 3D annotation. For example, the 3D data, texture information, and any metadata relevant for printing may be stored as a data stream as an object as part of the 3D annotation. The data stream can be a buffer in memory and/or a data store, such as a data file. Other information may be stored in accordance with the file format used. For example, a poster image may be stored to be used if a data viewer does not support 3D rendering. The poster image may be the default view of the 3D data. The poster image may be stored as an object that may include a data stream. In some embodiments, the poster image may be the first image file captured with camera 510.

Any suitable file format may be used to store the 3-D representation of the object. In the embodiment illustrated, that format may be a portable document format, such as 3D PDF, PRC, X3D, U3D, VRML97 or any other suitable format. As a specific example, the object may be stored in a file as a 3D object (called 3D Annotation) in the document in PDF language. An example of such a representation is shown in FIG. 20.

After a data file is formed, the 3D representation of an object stored in the data file may be displayed on a display 508. In embodiments in which the file is stored in a standardized format, presenting an image of an object may entail rendering the file using a standard viewer, such as viewer 516. In the example shown in FIG. 5, such an application may be PDF viewer 516 when the file is a 3D PDF file 520. Such a viewer, for example, may process the data representing a three dimensional object and format it for display on a two-dimensional display. However, it should be appreciated that file 520 may be presented on the display in any suitable way.

In some embodiments, the file 520 may be displayed while additional image frames are being acquired. Such a display may form a portion of a live feedback process 314 (FIG. 3) to provide a real-time visualization of the data acquisition process to a user. In such embodiments, a portion of the data may be processed and stored in a data file and/or viewed on the display. Alternatively or additionally, file 520 may be printed on a 3-D printer. File 520 may be further processed before printing. Though file 520 may be in a standardized format intended for 3-D printing, that format may accept representations of objects that are not suitable for printing. For example, defining surfaces and textures may result in definitions of objects that are not physically realizable or, if printed exactly as described would be unstable or too fragile. Accordingly, some structures identified from processing the point cloud may, in some scenarios, not be physically realizable or may not be practical to print. Accordingly, file 520 may be further processed to create a modified file 522 in a 3-D printer format, such as by adding and/or removing information to make the three-dimensional representation suitable for printing by a three-dimensional printer to form 3D printed model 528. Such additional information may include modifying information in file 520 so that all structures serving as walls have a certain wall thickness. Structural data may be added inside the volume of the 3D content data to provide structural integrity to 3D printed model. For example, if the surface of a volume is printed, the volume may collapse under its own weight and/or when handled by a user. Support structure inside the volume of the 3D printed model may be added to prevent collapsing of the model. Additionally, normals to the surfaces defining the volume representation may be checked and corrected to improve the printing process. Surface normals pointing towards the interior of the volume may be changed to point to the exterior of the volume. Such correction of the direction of the surface normal where necessary may improve the printing process and may reduce costs because less printing material may be used during printing. In the example shown in FIG. 5, processing the 3D data is performed by a processor on the smartphone. However, it should be appreciated that a processor on another device may also perform processing of the data.

File 522 may contain a flag or other metadata to indicate that it has been processed to contain only printable information. For example, such a flag may be represented as "/3DPrintable" or in any other suitable way. This flag may be set upon creation of the modified file. It may be checked by a printer 524 prior to attempting to print an object from the file.

When a modified file 522 is created representing a 3D object, that file may be transmitted over a network to a printer for printing. The file 522 may alternatively be stored for printing at a later time. Additionally or alternatively, data in the file 520 may be printed without first creating a modified file. Rather, file 520 may be printed through a virtual printer driver 523. Virtual printer driver 523 may perform the processing used to convert file 520 into a physically realizable representation of an object in a modified file 522. However, rather than store that information in a modified file, the virtual printer driver 523 may pass the information to the 3D printer to print a model of the object 528.

Regardless of the format from which the information is generated, a controller 526 on the 3D printer may receive the data and transmit instructions to components of the 3D printer 524 to print the 3D model 528. These operations may be performed in a known way for processing a file in a standardized format.

Figure 6:
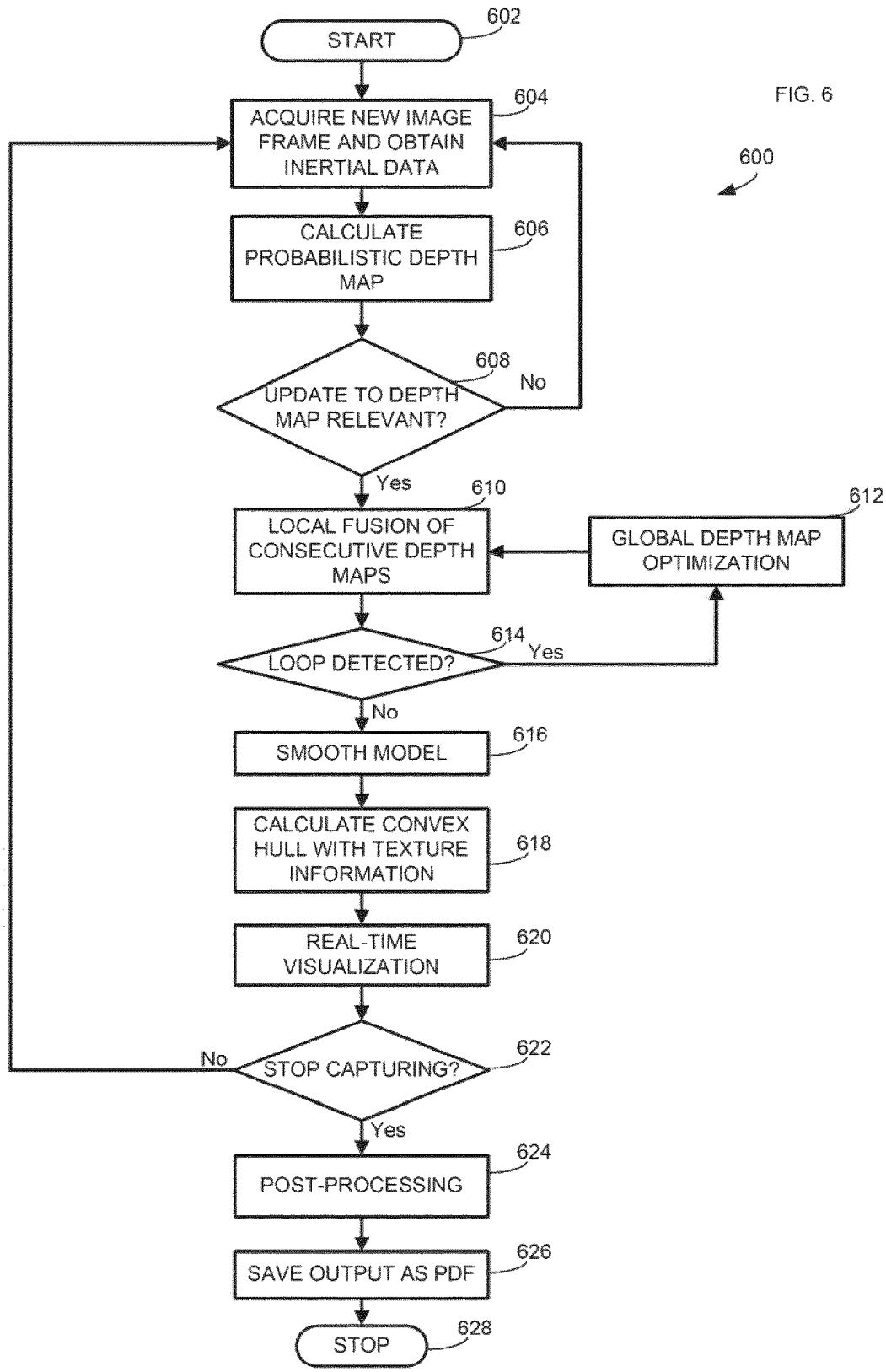
FIG. 6 is a flowchart of processing image frames to create a three-dimensional model, in accordance with some embodiments.

In some embodiments 3D printable information is developed by a portable electronic device that processes image frames sequentially and incorporates the image frames into the 3D representation of a composite image. FIG. 6 illustrates an exemplary process 600 that may be performed by a portable electronic device in accordance with some embodiments. For example, process 600 may be implemented by a processor within a smartphone or may be performed under the control of any suitable processor.

Process 600 may start at block 602, for example, when a user inputs a command through a user interface of the smartphone to begin a scan of a scene. The scene may comprise any type of object, made up of any number and type of items, and may be imaged as the smartphone is moved in different orientations in three dimensions around the scene. In some embodiments, an image of the scene being imaged may be displayed on a display of the smartphone as a real-time live view such that a user may observe what is being imaged as the user moves the smartphone 360 degrees around the object to capture multiple perspectives of the object.

At block 604, a new image frame is acquired with associated data from inertial sensors of the smartphone, indicating a position of the smartphone at the time the image frame was captured. Such an image frame may be captured in any suitable way, including as described above.

Next, at block 606, the new image frame and associated inertial data may be used to calculate a probabilistic depth map. To calculate the depth map, features of the object may be identified in the new image frame. Those features may be compared to corresponding features in other image frames or already incorporated into a point cloud. Positions of the points representing features in the object may be determined in three dimensions using techniques as described herein or in any suitable way.

For example, similar features may be captured in multiple image frames and locations of those features may be determined using geometric analysis. Detected motion of the portable electronic device between capture of those image frames may serve as known values in a system of equations with the locations of the points in the point cloud representing those features as the unknowns for which a solution may be determined using linear algebraic techniques or other suitable computations. In an over constrained system such as may result from multiple image frames showing the same features, some ambiguity may exist in the result, which may be used as an indication of a probability that the correct location of the points representing features has been determined. This information may be used in attaching probabilities to points in a probabilistic depth map. Other information indicating accuracy of the representation may alternatively or additionally be used.

As a specific example of another way in which a probability may be associated with a position of a point representing a feature in an image frame, the probability that the features in multiple image frames used to compute location of the point actually represent the same feature of the object may be determined. That determination may be made using a cross-correlation to determine regions of similarity between image frames. A matching score for a depth may be determined based on the cross-correlation between image frames. For example, when two image frames have a region of similarity with a high cross-correlation, the matching score may be high. An accurate depth estimate may be indicated by a high matching score.

Once locations of points associated with features in an image frame are detected, those points may be integrated into a depth map for the object, if warranted. At block 608 the process may branch based on whether the additional information provided by a new image frame warrants an update to the depth map. Processing at decision block 608 may determine whether addition of points from a localized depth map is warranted. Such a determination may be based on the probabilities associated with the points in the localized depth map. For aggregate probabilities below a threshold, for example, no update may be made. Alternatively or additionally, the overlap with regions already represented by the depth map may be used as a criteria. The overlap, for example may be in a range, such as 10% to 70%.

Regardless of the criteria used, if the criteria are met, processing may proceed to block 610 where the local depth map is fused with the depth map. Fusing may include matching points in the localized depth map to points in the depth map. The locations of points in the depth map may be adjusted to minimize an error function between the positions of points in both the local depth map and the full depth map. That error function may be a weighted average of positions based on the probabilities associated with each point or the number of image frames used to compute the location of corresponding points in each of the local and full depth maps.

Moreover, data fusion may entail, in addition to updating positions of points in the full depth map, updating the probability/certainty associated with those points. For example, the certainty may increase as the number of image frames processed to determine location of a point increases. Alternatively, the certainty may be a statistical measure of variance of measured locations of all the points fused to represent one point. However, any suitable fusion processing may be used.

Accordingly, when the depth map based on the new image frame is determined to be relevant, local fusion of consecutive depth maps may occur by block 610. Depth maps may be fused or merged to form a combined depth map in any suitable way. The combined depth map may include data representing more of the object than each depth map prior to the merging process. A newly generated depth map may be merged with a previous depth map determined by previous image frames. In other embodiments, inertial sensor data may be used when merging consecutive depth maps. Smartphone position and orientation for different image frames may be determined from the inertial sensor data which may be used for determining an initial estimate of relative position and orientation of different depth maps. When the inertial sensor data indicates that two or more depth maps are capturing a similar region of the object, the depth maps may be combined to form a combined depth map. Additionally or alternatively, a non-linear processing of data may be used to improve the merging of depth maps. The data included in such non-linear processing may include data from the image frames and/or inertial sensor data.

As more of the object is scanned, more image frames are acquired, and a depth map corresponding to more of the object may be determined. As a new depth map is extracted from each incoming image frame and is added to the combined depth map, a local depth map associated with a new image frame may overlap a portion of the depth map that is not associated with an immediately preceding image frame. Such a series of depth maps may be thus taken as closed in a "loop" because the user has "looped" back to image the same portion of an object again.

When a "loop closing" is detected, process 600 may proceed to block 612. An inconsistency between the position of the depth maps that overlap at the loop closing may be detected. This inconsistency may represent an accumulated error, and a fine or global alignment may reduce this inconsistency to achieve a more accurate mapping between the depth map, as illustrated by block 612. The points in the depth map associated with image frames captured in a sequence between the image frames that define the location where the loop is closed may be "globally" rearranged to reduce error, using techniques described below. After a global alignment is processed, additional depth maps may be merged with the combined depth map.

When a loop is not detected, the process 600 proceeds to block 616 where a smoothed model or depth map is determined from the combined depth map. As part of the smoothing process, de-noising or filtering of the depth map may occur using any suitable technique. In some embodiments, the accuracy of the points in the depth map may be used when processing the depth map. The accuracy of the points may be determined when the probabilistic depth map was calculated in block 606. A threshold level of accuracy may be applied to the points in the depth map. Points that are more accurate may be kept while points that are less accurate may be discarded. Such a smoothing process may remove points from the model that are unlikely to be correct and/or produce artifacts in the smooth model. Such artifacts may include points disconnected from the smooth model. In some embodiments, texture information associated with each point in the depth map may be used in the smoothing process. For example, the threshold value applied to certain points in the depth map may vary depending on whether there is more or less texture information available for those points.

After a smooth model of points is obtained, a surface for those points may be calculated by block 618. Such a surface may be determined by calculating a convex hull for the points in the smooth model. The surface may define a volume representative of the scanned object. Such a volume may be closed and/or 'watertight'. The resulting volume may be improved for printing of the model by a three-dimensional printer. Texture information may overlay the convex hull as part of the representation of the scanned object. Such texture information may be projected onto the surface by mapping specific texture information to regions of the surface. In some embodiments a UV mapping process may be used where points on the surface are designated by axes, such as U and V, that lie on the surface. Texture information may be mapped onto the surface by designating points in reference to such axes. Such texture information may be two dimensional to map on the surface of the convex hull.

The convex hull and texture information may be visualized on a display in real-time by block 620 as more image frames are acquired and processed. Any suitable techniques may be used to render the convex hull and texture information. In some embodiments, the convex hull and texture information may be rendered overlaying the object in the current image frame on the display. Using such a technique, regions and/or perspectives of the object that remain to be captured are indicated in real-time. Such real-time visualization techniques may also improve correct texture and material mapping on the convex hull.

Image frames may be captured until there is a signal registered by the smartphone to stop capturing image frames as indicated by block 622. The scanning may be stopped based on user input, passage of a predetermined time, determination that image data for the area representing an object is required, or in any other manner. When no signal to stop capturing is present, process 600 proceeds to block 604. When there is a signal to stop capturing, no additional image frames are acquired and the process proceeds to post-processing steps indicated by block 624. The signal to stop capturing additional image frames may be based on user input. Additionally or alternatively, capturing of image frames may be stopped after a complete convex hull is acquired and/or if a certain level of accuracy or quality is achieved in determining the convex hull.

The data for the convex hull and texture information may be further post-processed at block 624. Such post-processing may include processing the convex hull and texture information in any suitable way to make the data suitable for printing by a 3D printer. Such processing may include adding information to improve the 3D printed model. Such additional information may include instructions to print with a certain wall thickness to add stability and structure to the printed model. Normals to the surfaces defining the volume representation that point to the interior of the volume may be identified and flipped to point to the exterior of the volume. Such checking of the direction of the surface normals and correcting the direction where necessary may improve the 3D printing process. Associated printing costs may also be reduced from checking and changing the direction of the normal. Post-processing may also occur while additional image frames are being acquired. In some embodiments, the post processing may be performed in parallel with image acquisition, such that the timing of post processing may be independent of the timing of any of the operations illustrated in FIG. 6.

Data for the convex hull, texture information, and/or additional information from post-processing may be stored in one or more data files, as illustrated by block 626. The convex hull data and the texture information data may be stored in separate data files or in the same data file. The additional information from post-processing may be stored in the metadata of a data file containing the convex hull data and/or the texture information data. In some embodiments, the convex hull data, texture information data, and any post-processing information may be stored in a PDF. However, the convex hull data, texture information data, and post-processing information may be stored in any suitable data format. Once the data is stored appropriately, process 600 may end according to block 628.

Figure 7:
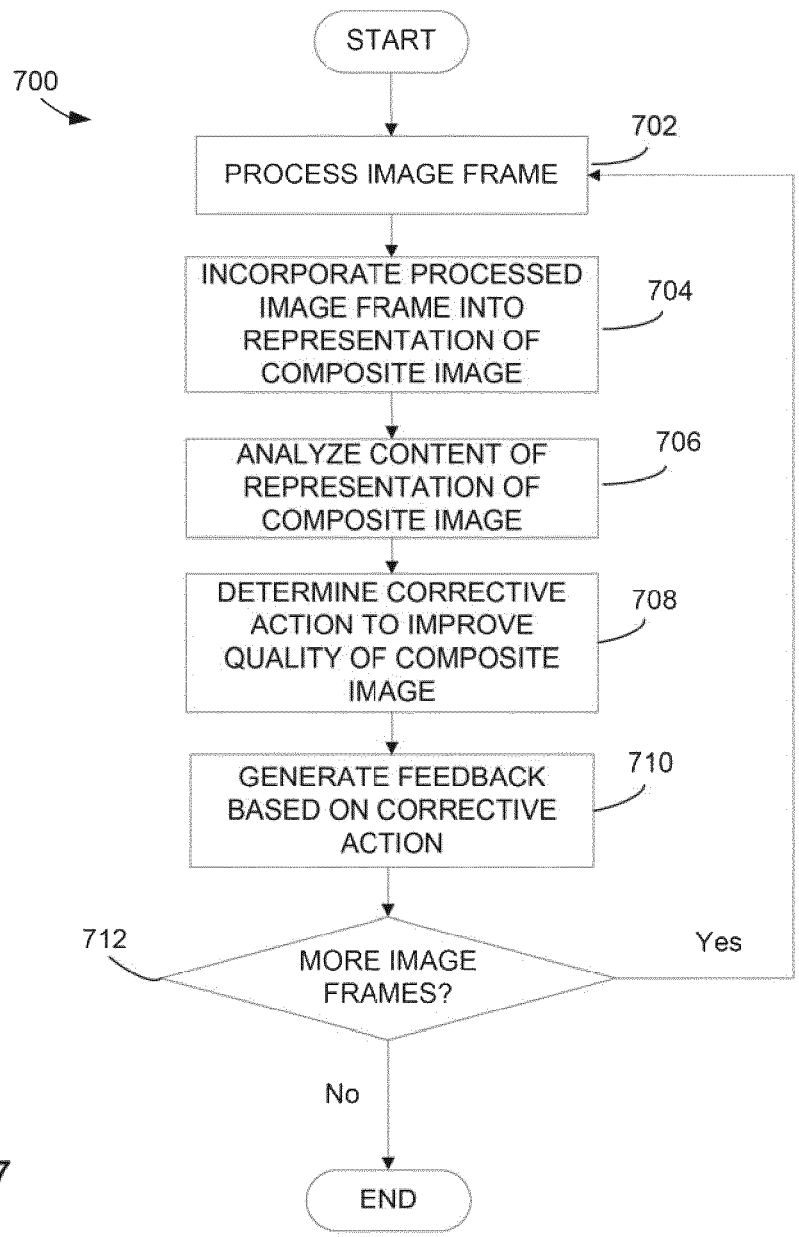
FIG. 7 is a flowchart of processing image frames to improve a quality of a composite image and providing feedback to a user, in accordance with some embodiments.

In some embodiments, feedback on the image processing may be provided in various ways based on processing of an image frame and analysis of the composite image. FIG. 7 illustrates an overview of an exemplary process 700 of providing feedback in accordance with some embodiments.

Process 700 may be implemented by a processor within a smartphone or may be performed under the control of any suitable processor.

Process 700 may start, for example, when a smartphone operated to scan a scene captures an image frame comprising an image of the scene. The scene may comprise any types of object, made up of any number and type of items, and may be imaged as the smartphone is moved in different orientations in three dimensions. An image of the object being imaged may be displayed as a real-time live view. Motion sensors of the smartphone may provide output indicating a position of the smartphone at a time when the image frame was captured.

At block 702, the captured image frame may be processed, which may include extracting various features from the image frame, unrotating some or all of the features as needed, correcting for lens distortion, smoothing, white balancing, and performing other types of pre-processing to correct one or more characteristics of the image frame. In some embodiments, it may be determined whether to discard the image frame because its quality is below a minimum acceptable requirement, or whether to proceed with using the image frame as part of building the composite image. In the example illustrated, the image frame is determined to be acceptable for further processing.

Next, at block 704, the processed image frame may be incorporated into a representation of the composite image. As discussed above, the representation may comprise a three dimensional point cloud comprising sets of points representing features of respective image frames. The image frame may be coarsely positioned within the point cloud based on a position of a preceding image frame positioned within the point cloud. The content of the representation of the composite image may then be analyzed, at block 706. The analysis may include determining quality of the composite image.

Based on the quality analysis, one or more corrective actions may be determined to improve the quality of the composite image, at block 708. The corrective actions may comprise reducing inconsistencies in the composite image to finely align image frames within the composite image. Multiple others corrective actions may be performed.

Feedback based on the corrective action may then be generated, at block 710. The feedback may comprise indicating to the user that a portion of the composite image needs to be imaged again, that a portion of the object which was imaged has a poor quality, etc. The feedback may be generated in real-time, as the smartphone is being used to image the scene.

In some embodiments, the feedback may be provided so that the user may adjust positioning of the smartphone while imaging the scene. Feedback to the user may be provided in any suitable way. In some embodiments, that feedback may be provided through a user interface of the smartphone 200. A suitable user interface may include, for example, a display, through which the feedback may be displayed graphically or as text, or an audio output, through which the feedback may be presented in an audible fashion.

In some embodiments, an instruction to adjust one or more operating parameters of a camera of the smartphone, including its position, orientation or rotation, may be generated. The instruction may be provided as a visual indication to the user of the smartphone or may be generated automatically as a control signal to one or more hardware components of the smartphone.

Process 700 may then follow to block 712 where it may be determined whether there are more image frames to be captured. For example, as the smartphone is used to scan a scene, multiple images of different portions of the scene may be captured until a user provides input representing a stop command. Accordingly, process 700 may execute continuously as new image frames are added to the composite image and the composite image is adjusted based on the new frames. While the scan continues, a next image frame may be acquired and process 700 may loop back to block 702. Each new frame may be used to expand the extent of the object represented in the composite image. Alternatively or additionally, as image frames are captured that depict portions of an object already depicted in captured image frames, the new image frames may be combined in any suitable way with the previously captured image frames in the overall composite image. If the image acquisition is completed, process 700 may stop.

Figure 8:
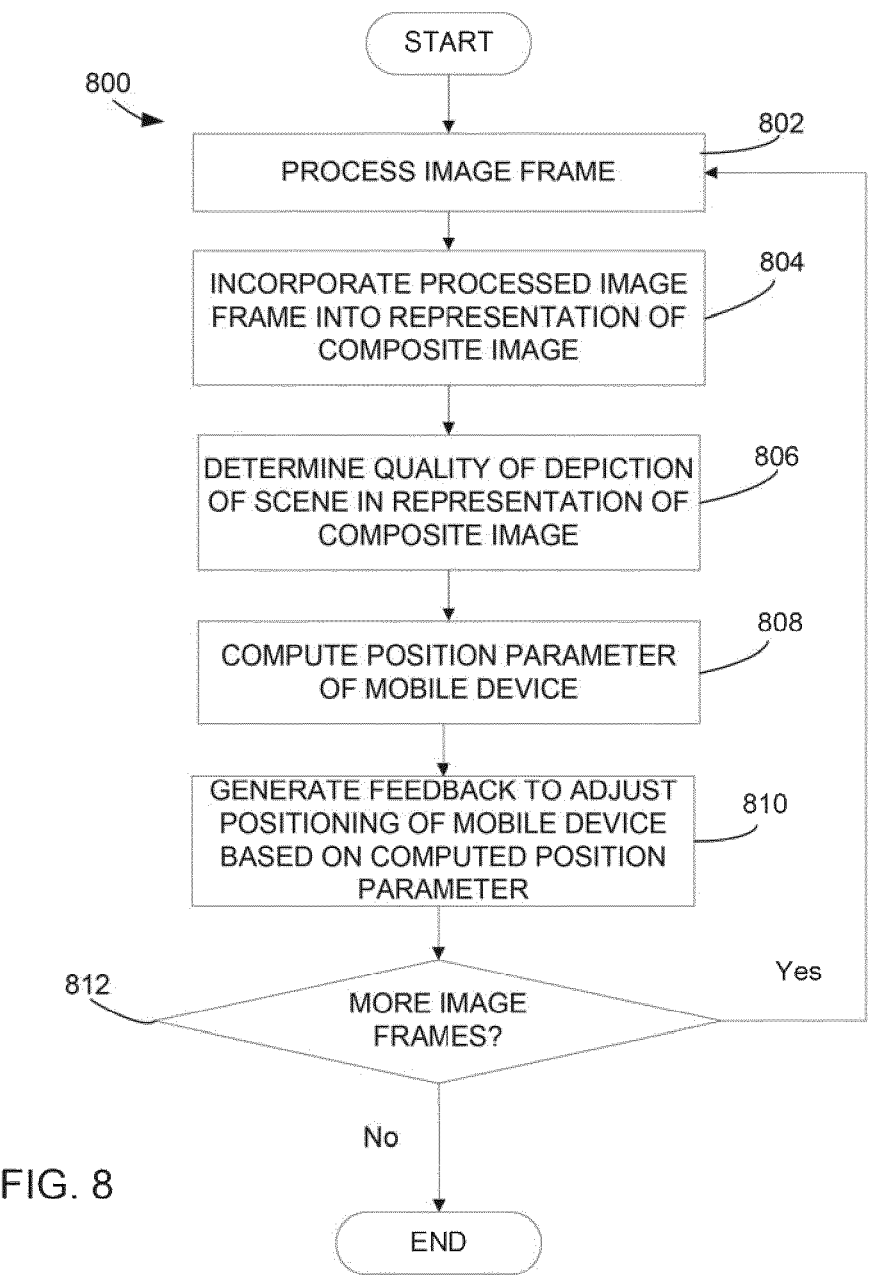
FIG. 8 is another flowchart of processing image frames to improve a quality of a composite image and provide feedback to a user, in accordance with some embodiments.

FIG. 8 illustrates another process 800 of providing feedback to the user of the smartphone based on real-time processing of image frames captured as part of a scan of an image. Process 800 includes pre-processing of a captured image frame, at block 802, and incorporating the processed image frame into the representation of the composite image, at block 804, which may be performed similar to processing at blocks 702 and 704 in FIG. 7. As with process 700, process 800 may be performed under control of a processor of a smartphone executing stored computer-executable instructions or using other suitable circuitry within a smartphone, or in any other suitable way.

As shown in FIG. 8, at block 806, quality of a depiction of a scene in the representation of the composite image may be determined. This analysis may involve analyzing the content in one or more portions of the composite image for characteristics representative of a reflection, a shadow, or other artifacts. The quality analysis may also comprise analyzing a result of applying an optical character recognition to one or more portions of the composite image.

The determination of the quality of the depiction of the scene in the representation of the composite image may include analyzing image features in an image frame and image features in one or more prior image frames representing overlapping portions of the scene. The image features may comprise a specular highlight and other features. If one or more image features compromising quality of the image frame are detected in the image frame, one or more characteristics of the image frame may be corrected before incorporating the image frame into the composite image.

At block 808, a position parameter of the smartphone may be computed. Because the smartphone may be moved in an unrestricted manner in three dimensions and can be used to capture images of a scene at different distances and different angles relative to a plane of the scene, the computed position parameter may comprise at least one position parameter that does not define a location within a plane parallel to a plane of the scene, at least one position parameter that defines a spacing between the scene and the smartphone, at least one position parameter that defines an angle of the smartphone with respect to a normal to the scene, and/or other type of parameter, such as a parameter indicating where to position the smartphone to acquire subsequent image frames.

Next, feedback to adjust positioning of the smartphone based on the computed position parameter may be generated, at block 810. The feedback may include guidance to the user with respect to further operation of the smartphone to capture images of the scene. For example, when a portion of the scene has not been imaged yet or has been imaged to yield low quality images, an indication to position the smartphone to rescan that portion of the scene may be provided as a feedback. Any other forms of the feedback may be provided additionally or alternatively. The feedback may be provided in real-time, while the image frames of the scene are acquired.

Process 800 may then follow to block 812 where it may be determined whether there are more image frames to be captured, which may be the case when the scan of the scene is not yet completed and the user continues to operate the smartphone to capture images. While the scan continues, a next image frame may be acquired and process 800 may loop back to block 802. If the image acquisition is completed (e.g., if user input was detected instructing the smartphone to stop the scan), process 800 may end.

In some embodiments, operation of a camera of a smartphone (e.g., camera 202 of smartphone 200 in FIG. 2) may be controlled based on processing of images captured by the camera, and analyzing and improving a quality of the images, as a composite image is being built. The camera may be controlled, for example, via a controller such as controller 210 (FIG. 2).

Figure 9:
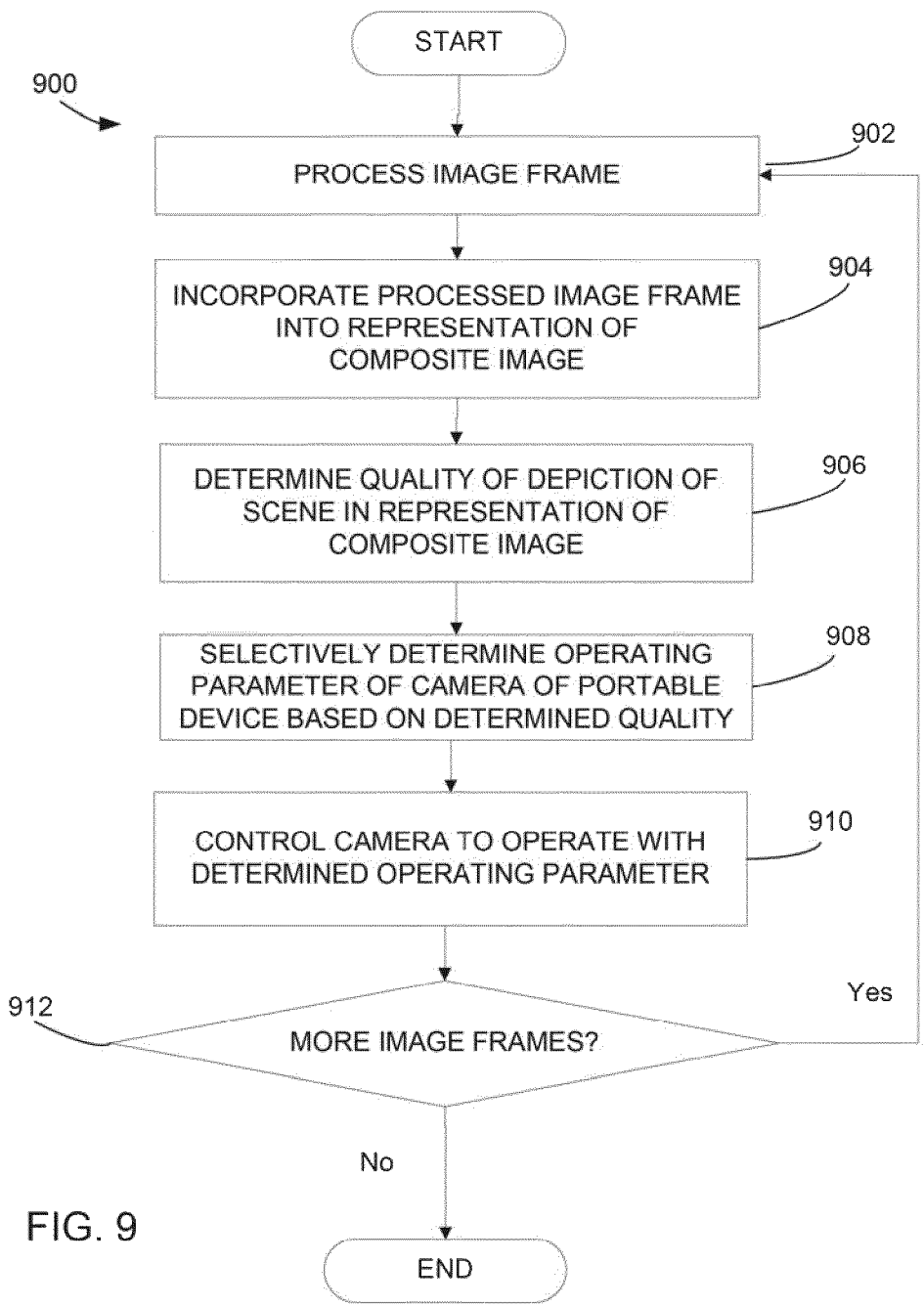
FIG. 9 is a flowchart of processing image frames to improve a quality of a composite image and controlling operation of a camera of a portable electronic device, in accordance with some embodiments.

FIG. 9 illustrates generally a process 900 of forming a composite image from multiple image frames representing images of a scene acquired using a smartphone. As with processes 700 and 800, process 900 may be implemented under the control of a processor on the smartphone or in other suitable processing circuitry. Process 900 may comprise sequential processing of image frames as they are captured and added to the composite image. It should be appreciated that, though shown as separate processes, the processes 700, 800 and/or 900 may be performed concurrently as a sequence of image frames is being captured. These processes may be performed on separate processing cores or may be performed on a single processing core using a time multiplexing arrangement.

As illustrated in FIG. 9, process 900 may include pre-processing of the captured image frame, at block 902, and incorporating the pre-processed image frame into the representation of the composite image, at block 904, which may be performed similar to processing at blocks 702 and 704 in FIG. 7. In process 900, sequentially processing image frames comprises, for image frames captured after controlling the camera to operate with the determined operating parameter, prior to incorporating an image frame in the representation of the composite image frame, adjusting the image frame based on the determined operating parameter of the camera.

Next, at block 906, a quality of depiction of the scene in a portion of the representation of the composite image may be determined. The determined quality of depiction of the scene may be expressed as a value of a metric.

As shown in FIG. 9, at block 908, an operating parameter of a camera of the smartphone may be selectively determined based on the determined quality of the depiction of the scene. In some embodiments, determining the operating parameter may comprise activating a flash on the camera when the value of the metric is below a threshold. Additionally or alternatively, selectively determining the operating parameter may comprise adjusting the amount of data captured in the image frame when the value of the metric is below a threshold.

The camera of the smartphone may then be controlled to operate with the determined operating parameter, at block 910.

Process 900 may then follow to block 912 where it may be determined whether there are more image frames to be captured, which may be the case when the scan of the scene is not yet completed and the user continues to operate the smartphone to capture images. While the scan continues, a next image frame may be acquired and process 900 may return to block 902. If the image acquisition is completed (e.g., if user input was detected instructing the smartphone to stop the scan), process 900 may end.

When a smartphone or any other mobile device is used to capture and process multiple image frames in accordance with some embodiments, the device may be moved freely back and forth, and closer and nearer and further from a scene being imaged. As a result, the image frames may be acquired in different planes and oriented differently with respect to the each other and a plane of the scene. In this way, the scene or portions of the scene may be captured in image frames positioned in planes that are not parallel to each other or parallel to the plane of the scene. More generally, the frame of reference of each image frame may be different.

Accordingly, to account for the three dimensional space in which image frames are acquired, image frames may be processed to map the image frames into a common frame of reference. The common frame of reference may be a plane or a volume. In this common frame of reference, the relative positions of the image frames may be determined or adjusted. The positions within the common frame of reference may define the position of the image frames within the composite image. In the embodiment illustrated in FIG. 3, the positions within the common frame of reference may initially be used to insert an image frame into a graph map, such as at block 306.

In some embodiments, mapping of an image frame may be performed based on features in the image frame. Features, such as corners or bright points, may be identified using known image processing techniques. The positions of these features within the common frame of reference may initially be estimated based on sensor outputs that provide an indication of motion and/or orientation of the smartphone.

Various factors may be considered in mapping features from an image frame to the common frame of reference. An orientation of the smartphone, distance from the object being imaged, zoom of the camera within the smartphone and any other sensor output providing positional information. This positional information may be used to compute a location of portions of an object being imaged at the time the image frame was acquired. This information may be used to translate features of an image frame to the common frame of reference.

Figure 10:
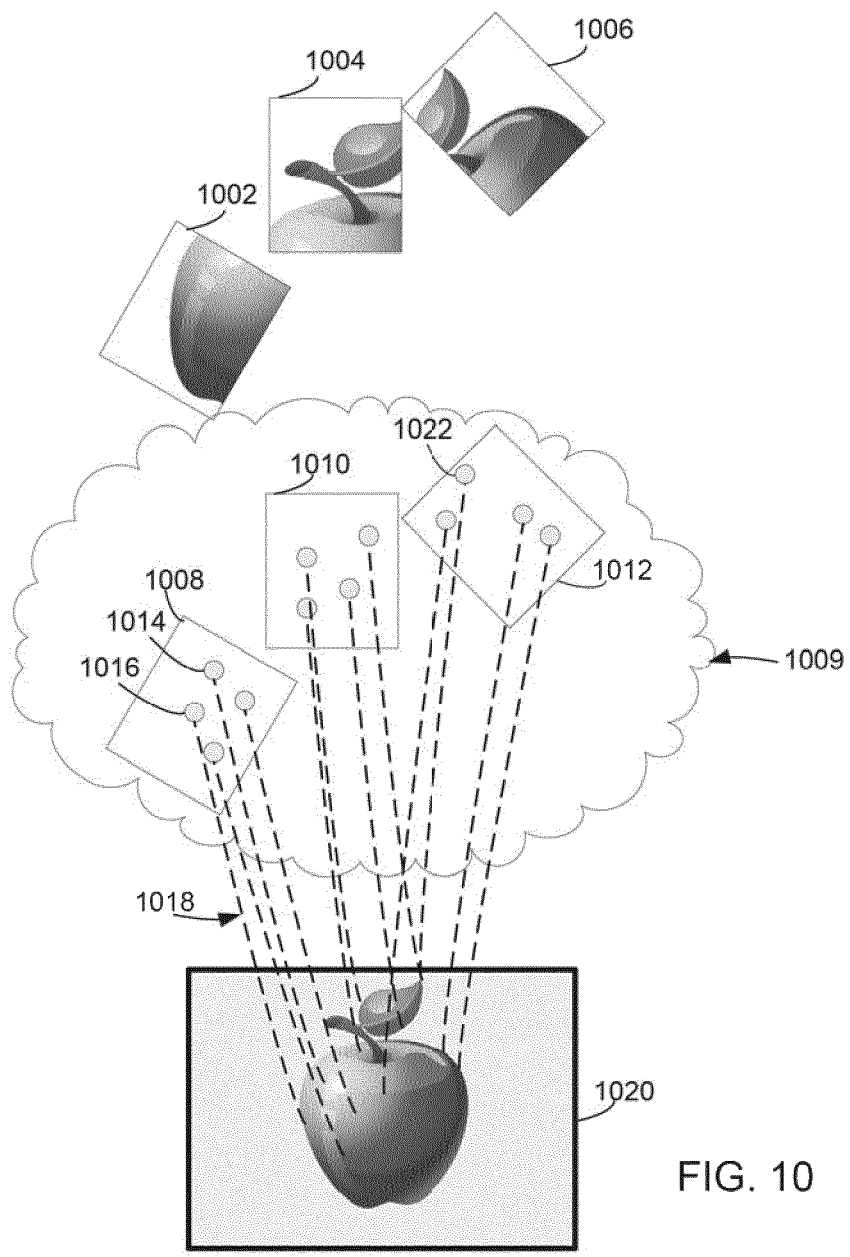
FIG. 10 is a sketch of a representation of image frames as a three dimensional point cloud, in accordance with some embodiments.

In some embodiments, the features within the image may be depicted as points, such that the features of the image frames may collectively be regarded as defining a three-dimensional point cloud. The point cloud may serve as a depth map. Such a point cloud, representing multiple image frames and their relationships, is shown in FIG. 10. The point cloud may be represented, such as by data characterizing the point could which is stored in a computer memory, to maintain an association between image frames and sets of points representing features extracted from the image frames. Moreover, the point cloud may be maintained in a way that allows the relative position and orientation of the points associated with an image frame to be adjusted.

As discussed above, when an image frame is captured, processing of the image frame includes extracting features. The features may also be processed to improve subsequent feature matching. Each image frame may be represented as a set of points representing features extracted from that image frame. FIG. 10 illustrates schematically exemplary image frames 1002, 1004 and 1006 each representing a portion of a scene and acquired as the scene is being scanned by a smartphone. In this example, image frames 1002, 1004 and 1006 represent different portions of the same object, an apple.

Once features from each of the image frames 1002, 1004, and 1006 are extracted, the image frames may be associated with sets of points representing the features in a three dimensional point cloud space 1009. The point cloud space may be represented in any suitable way, but, in some embodiments, is represented by data stored in computer memory identifying the points and their positions. As shown in FIG. 10, image frame 1002 may be represented as a set of points 1008, image frame 1004 may be represented as a set of points 1010, and image frame 1006 may be represented as a set of points 1012. Image frame 1002 includes, for example, points 1014 and 1016 representing corresponding image features of the image represented in image frame 1002. Other points in image frame 1002 and points in image frames 1004 and 1006 are not labeled for the sake of simplicity of the representation.

The sets 1008, 1010 and 1012 may initially be positioned within the point cloud 1009 based on position information of the smartphone at the time the associated image frame was captured. Though, subsequent processing may adjust the positioning of the sets within the point cloud space to create a composite image that more accurately represents a scene being imaged. The composite image may be a three-dimensional representation of the scene on a two-dimensional display. Alternatively or additionally, one or more of the sets may be deleted or altered, also as a result of processing to provide a desired composite image.

An image matching approach may be used to adjust the relative positions of the sets of points. In acquiring a sequence of image frames representing a scan of an object, the smartphone may be operated to capture image frames at a sufficient rate that successive image frames will at least partially overlap. By identifying overlapping portions of image frames that are adjacent in the sequence, the relative position of those image frames may be adjusted so that those features align.

Prior to matching the points representing features in adjacent images, the points may be associated with a common frame of reference for comparison. A common frame of reference, allowing comparison and alignment between successive image frames, may be created by projecting the points associated with each image frame into a common frame of reference. The common frame of reference may be a plane or a volume. Points in sets of points 1008, 1010 and 1012 may be projected, as shown by dashed lines 1018 in FIG. 10, into a common frame of reference 1020. Common frame of reference 1020 may represent the three-dimensional representation of the object displayed as a two-dimensional composite image that is being built as the scan progresses.

In some embodiments, as each set of points is projected, its three-dimensional position may be adjusted to ensure consistency with sets of points containing points representing an overlapping set of features. For example, as shown in FIG. 10, set of points 1010 and set of points 1012 may include an overlapping set of features, such as a feature represented by a point 1022. This point may correspond to the same feature in images 1004 and 1006. Coarse alignment of image frames in accordance with some embodiments may comprise adjusting a three dimensional position associated with each set of points to achieve coincidence in common frame of reference 1020 between points representing the same features, which may improve quality of the composite image rendered using those three dimensional positions for the image frames to assemble the composite image.

As more image frames are gathered and additional sets of points are added to the point depth map, the relative position and orientation of the sets of points may be adjusted to reduce inconsistencies, to thus achieve global alignment of the image frames. Thus, sets of points in depth map 1009 may be repeatedly adjusted and projected to common frame of reference 1020 to form the composite image that is displayed to the user on a user interface, such as the user interface on a display of the smartphone, or otherwise processed.

Figure 11:
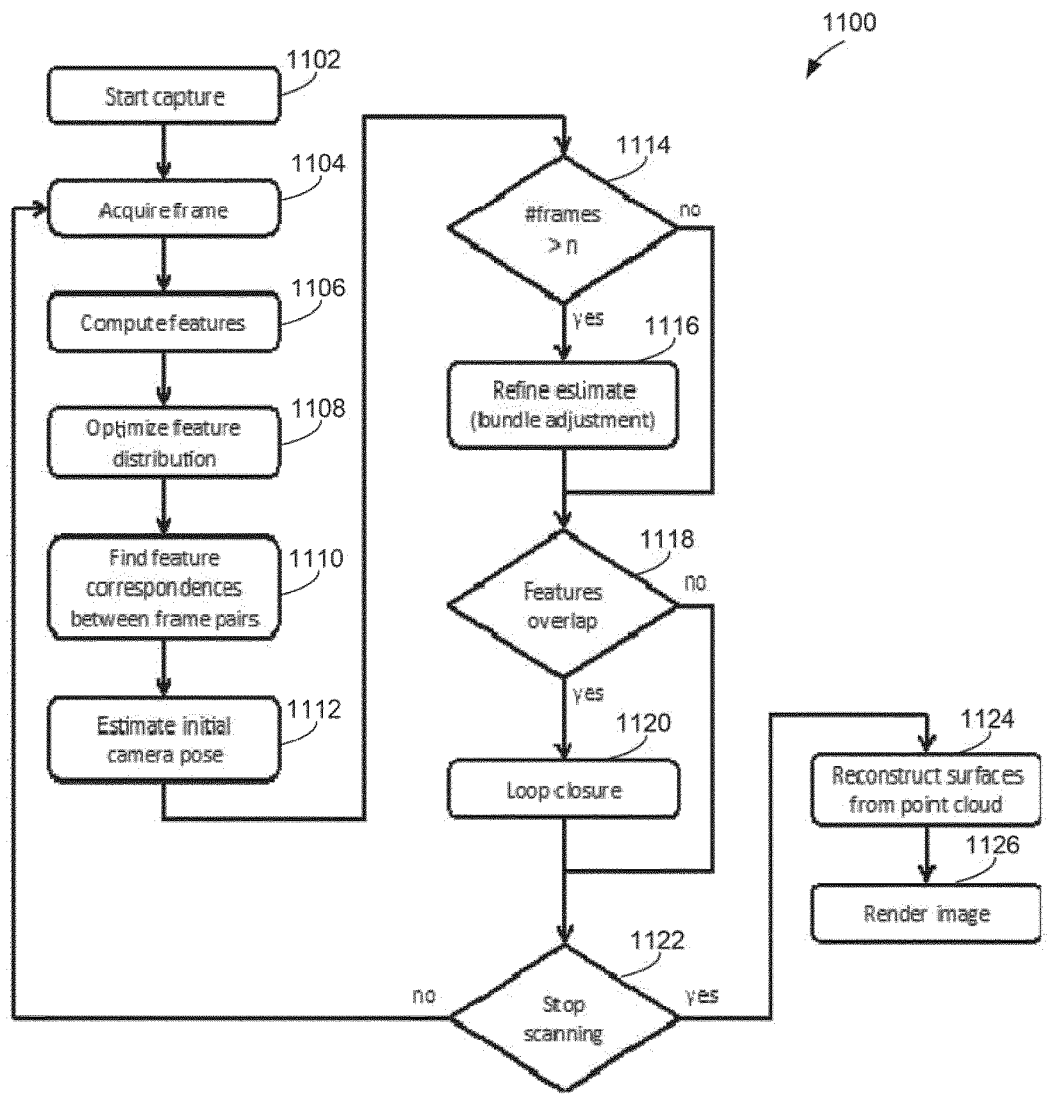
FIG. 11 is a flowchart of a process of building a composite image by representing features of image frames as the three dimensional point cloud, in accordance with some embodiments.

FIG. 11 illustrates a process 1100 of building a composite image by representing features of image frames in the three dimensional point cloud, in accordance with some embodiments. Process 1100 may be implemented by an application executing on a processor a smartphone, as described above, or using any other suitable processing circuitry.

Process 1100 may start at block 1100 when capturing a stream of image frames of an object by a smartphone (e.g., smartphone 102 in FIG. 1) is initiated. The capturing may be initiated based on user input or any other type of trigger. In some embodiments, the smartphone may be instructed to operate in a capture mode to acquire image frames using a camera (e.g., camera 202 in FIG. 2). The object may be any object which can be imaged as the smartphone is moved in the three-dimensional space.

An image frame may be acquired at block 1104. Next, the acquired image frame may be processed by computing that extracts one or more image features from the image frame. The features may be any suitable types of features, such as color, shape, texture features, etc. For example, lines, edges, corners, contours, junctions and any other features may be extracted. A subset of the extracted features may be selected at block 1108. In some embodiments, this selection may involve optimizing the feature distribution to achieve approximately the same number of features in each image frame from the image frames that form a composite image, where that number of features may be independent of texture characteristics of the image frames. However, any suitable approach for selecting suitable features for use in matching image frames may be applied.

As shown in FIG. 11, next, at block 1110, process 1100 may find feature correspondences between pairs of image frames. A succeeding image frame may be compared with one or more previously captured image frames to identify corresponding features between each pair of frames. Such correspondences may be identified based on the nature of the feature characteristics of the image frames surrounding the features or other suitable image characteristics.

In some embodiments, the processing at block 1110 may involve using a set of features computed for a respective image frame to estimate the epipolar geometry of the pair of the image frames. Each set of features may be represented as a set of points in a three-dimensional space. Thus, the image frame acquired at block 1104 may comprise three-dimensional points projected into a two-dimensional image. When at least one other image frame representing at least a portion of the same object, which may be acquired from a different point of view, has been previously captured, the epipolar geometry that describes the relation between the two resulting views may be estimated. The epipolar geometry may be estimated using techniques as are known in the art.

In some embodiments, identification of feature correspondences may include searching, for each point in the image frame, for a corresponding feature in another image frame along a respective epipolar line. The three-dimensional points representing the image frame may be re-projected to establish correspondences to points that may be visible in the current image frame but not in the immediately preceding image frame—e.g., when the current image frame overlaps with a prior image frame other than an immediately preceding image frame in a stream of image frames.

At block 1112, an initial pose of a camera indicating its position and orientation with respect to an object being scanned at a time when an associated image frame was acquired may be estimated, at block 1112. The initial pose may be estimated based on output from inertial sensors (e.g., sensors 206 in FIG. 2) and/or any other types of sensors of the smartphone. It should be appreciated that the initial camera pose may be estimated simultaneously with processing at one or more of the blocks 1104-1110.

After the image frame is inserted into a composite image, the initial pose of a succeeding image frame may be adjusted based on poses of image frames that are already present in the composite image and at least partially overlap with the succeeding image frame. In some embodiments, the adjustment may be performed for the entire composite image. Though, in some embodiments, poses of a portion of image frames in the composite image may be adjusted. In some embodiments, the simultaneous adjustment of poses of a number of overlapping images may be referred to as bundle adjustment.

In some embodiments, initially, the set of points representing features extracted from the image frame, may be positioned within a three-dimensional depth map based on position information of the smartphone at the time the associated image frame was captured, such as the estimated pose of the smartphone. As each set of points is added to the depth map, its three-dimensional position may be adjusted to achieve coincidence in the common frame of reference between points representing the same features, thereby improving the quality of the composite image. In this way, a coarse alignment of the image frames may be performed.

The coarse alignment is based on a local comparison of an image frame to one or more easily preceding image frames that were acquired in a sequence of frames. As more image frames in a sequence of image frames are processed, additional information becomes available to refine the coarse estimation of the relative positions. Accordingly, it may next be determined, at decision block 1114, whether the number of image frames that have been captured is greater than a threshold n. If it is determined that the number of image frames is greater than the threshold, process 1100 may follow to block 1116 where the initial pose of one or more image frames may be adjusted. The adjustment may be performed by solving an optimization problem, such as, for example, a bundle adjustment, or other type of problem. Bundle adjustment algorithms can simultaneously solve for locations of all of the camera positions to yield globally consistent solutions. The bundle adjustment or other suitable techniques may be used to generate the point cloud comprising sets of points each representing features extracted from an image frame.

If it is determined that the number of image frames is smaller than the threshold, process 1100 may branch to decision block 1118 where it may be determined whether one or more features of the succeeding image frame overlap with at least one prior image frame other than the immediately preceding image frame. If this is the case, a "loop closure" may be detected, at block 1120. An example of a loop closure, in a two-dimensional space, is illustrated in FIG. 15, below. A loop closure may also occur in a three-dimensional space when acquiring multiple perspectives of an object. When a loop closure is detected, the three-dimensional points may be re-projected into a current viewpoint so that the three-dimensional positions and camera poses can be optimized. When no loop closure is detected based on the features overlap, process 1100 may follow to block 1122, as shown in FIG. 11.

At decision block 1122, it may be determined whether the scanning of the object is to be stopped. The scanning may be stopped based on user input, passage of a predetermined time, determination that image data for the area representing an object is required, or in any other manner. If it is determined that the scanning of the object is completed, process 1100 may follow to block 1124, where a surface of the scanned object may be reconstructed using the three-dimensional point cloud. The surface reconstruction may include de-warping, refection removal and other adjustments to improve the quality of the composite image. In this way, a geometry of the scanned object may be determined. The positions of the acquired image frames relative to that geometry have also been determined. An image of the scanned object may then be rendered, at block 1126. Because the geometry of the scanned object has been determined, a viewpoint of the output image can be determined.

When it is determined, at decision block 1122, that the scanning of the object is not completed, process 1100 may branch back to block 1104 where a next image frame may be acquired by scanning the object.

In the embodiments described above, image frames representing images of an object being imaged may be captured by a smartphone moved, during scanning process, into multiple orientations in the three dimensional space. However, by mapping features representing the image frames into a common frame of reference, processing may be performed in a common frame of reference much the same way that processing might be performed on image frames acquired by a portable device moving with a single orientation. In the following, processing in a common frame of reference is described for ease of illustration. It should be remembered, however, that when adjusting estimates of the relative position between image frames, the possibility of motion in all dimensions in the three-dimensional space may be accounted for in the adjustments.

Figure 12:
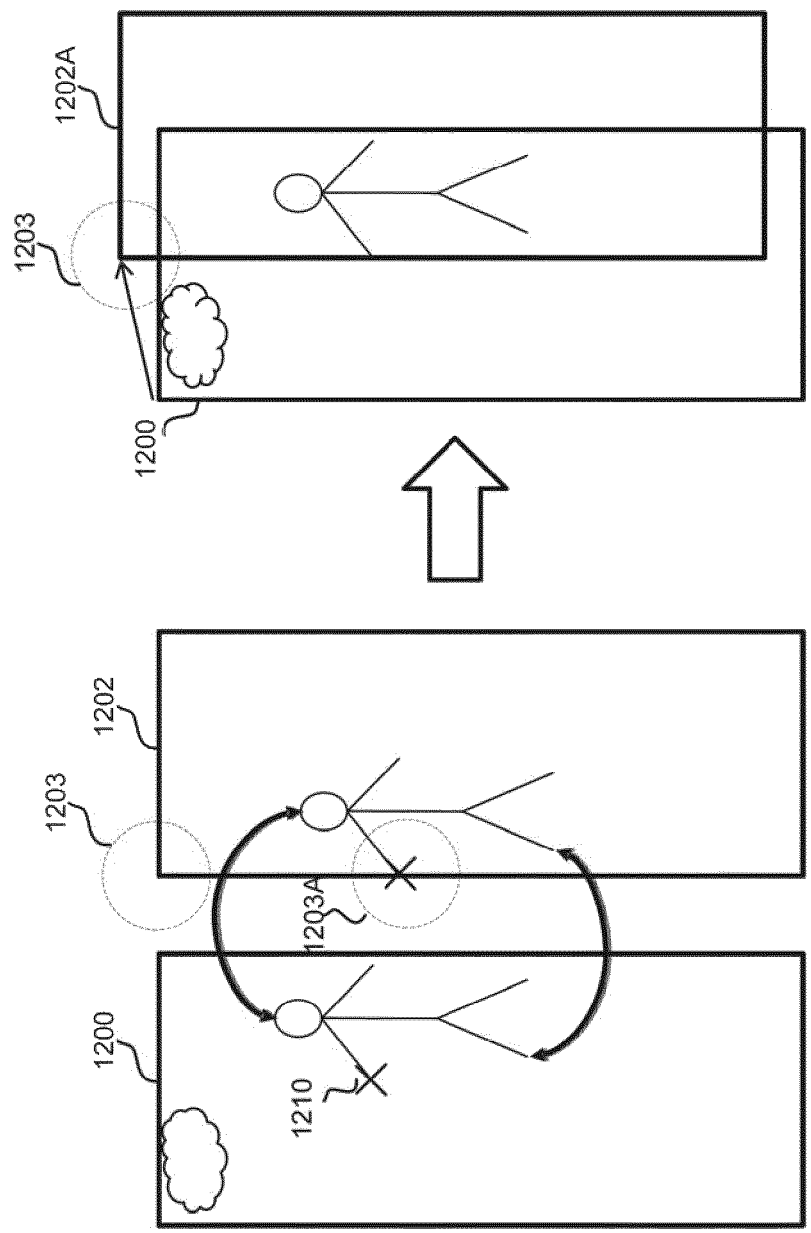
FIG. 12 is a schematic diagram that illustrates adjusting a pose of an image frame by aligning the image frame with a preceding image frame, in accordance with some embodiments of the invention.

To further illustrate the processes of coarse image frame alignment and subsequent refinement, FIG. 12 provides an example of coarse positioning of two consecutive image frames in accordance with some embodiments. Coarse positioning of image frames of a scanned object may comprise aligning consecutive image frames based on matching portions of the image frames showing corresponding portions of the object being scanned. FIG. 12 schematically illustrates such a process of aligning two image frames based on matching portions of the image frames corresponding to respective portion of the object being scanned. In this example, an image frame 1200 represents a preceding image frame and image frame 1202 represents a succeeding image frame taken as a scanning device moves over the object being scanned. Though, image frame 1202 may be aligned with any one or more image frames that partially overlap with image frame 1202, based on matching content of the image frames within the overlapping areas.

During the coarse positioning, an initial pose of image frame 1202 may first be estimated based on information from one or more inertial sensors (e.g., inertial sensors shown in FIG. 2). The initial pose estimate may be associated with some imprecision expressed as a zone of uncertainty 1203, as shown in FIG. 12. Though not readily illustrated in a two dimensional drawing, the zone of uncertainty may represent uncertainty in both displacement and orientation. In some embodiments, the zone of uncertainty may be a three-dimensional region. In a scenario in which image frames are captured using a portable electronic device, uncertainty and orientation may reflect the possibility that the portable electronic device has been rotated in the plane parallel to the plane of an object being imaged as well as tilted in any number of directions with respect to that plane.

In some scenarios, the zone of uncertainty may be small enough that an initial pose estimate may provide adequate coarse positioning of image frame 1202. However, in some embodiments, alternatively or additionally, a second coarse positioning technique based on matching content in a portion of image frame 1202 with content in a corresponding portion of image frame 1200 may be used.

The pose of image frame 1202 that results in a suitable match of content in the overlapping areas may be taken as the position of image frame 1202 relative to image frame 1200. The pose that provides a suitable match may be determined based on aligning features or other image content. Features, such as corners, lines and any other suitable features, may be identified using known image processing techniques and may be selected for the matching in any suitable way.

In some embodiments, the matching process may be simplified based on positioning information. It may be inferred that the pose of image frame 1202 that aligns with image frame 1200 provides a pose within area of uncertainty 1203. To reduce processing required to achieve alignment and to thus increase the speed of the local positioning of image frames, in some embodiments, the position information obtained from the inertial sensors may be used. If image frame 1202 is aligned with image frame 1200 using feature matching, processing required to find corresponding features can be limited by applying the zone of uncertainty 1203. For example, image frame 1200 includes a feature 1210. A corresponding feature should appear in image frame 1202 within a zone of uncertainty 1203A around a location predicted by applying position information output by the inertial sensors that indicates motion of the smartphone between the times that image frame 1200 was acquired and image frame 1202 was acquired. Accordingly, to find a feature in image 1202 corresponding to feature 1210, only a limited number of features need to be compared to feature 1210.

It should be recognized that feature matching as shown in FIG. 12 is illustrated based on features already projected into a common frame of reference for both image frames being compared. The projection of each image frame into the common frame of reference is based on a mapping derived from an assumed position and orientation of the portable electronic device when the image frame was captured. The assumed orientation may impact the spacing between features and other aspects of the image frames as projected into the common frame of reference. Inaccuracies in the assumed orientations may impact how well features in one image frame align with a corresponding set of features in another image frame when both are projected into the common frame of reference. Accordingly, searching for a relative position and orientation of image frames that align corresponding features in the image frames may entail determining the appropriate orientation of the portable electronic device used in projecting feature sets of the image frames into the common frame of reference.

If other matching techniques are employed, position information may also be used in a similar way. For example, overlapping regions in different poses of image frame 1202 are iteratively compared on a pixel-by-pixel basis, the position information can be used to identify overlapping portions to be compared and to limit the number of poses to be tried to find a suitable match.

Regardless of the matching technique employed, any suitable criteria can be used to determine a suitable match. In some embodiments, a match may be identified by minimizing a metric. Though, it should be appreciated that a suitable match may be determined without finding an absolute minimum. As one example, a pose of image 1202 may be selected by finding a pose that minimizes a metric expressed as the sum of the difference in positions of all corresponding features. Such a minimum may be identified using an iterative technique, in which poses are tried. Though, in some embodiments, known linear algebraic techniques may be used to compute the pose yielding the minimum.

In FIG. 12, image frames 1200 and 1202 contain matching portions comprising equal image content which is shown by way of example only as a strawman. Once the equal image content in image frames 1200 and 1202 is identified using any suitable technique, the image frames may be aligned using the equal image content. In FIG. 12, image frame 1200 aligned with image frame 1202 is shown by way of example only as image frame 1202A.

In embodiments of the invention, scanning of an object may be performed by moving a smartphone around the object. A stream of image frames may thus be captured which are then stitched together to form a composite image representing the object. The composite image may be a three-dimensional representation of the object displayed in a two-dimensional image. As a user is moving the portable electronic device relative to the object and new image frames in the stream are being captured, their respective coarse positions may be determined. Sets of points may be extracted from each new image frame and added to the depth map based on a coarse positioning of the new image frames. Each coarsely positioned set of points may be presented on a display device in a position proportional to its determined position within the composite image. The coarse positioning can be performed fast enough that new sets of points may be displayed to the user on the display device with a small delay relative to when the image frames are captured. As a result, a composite image representing a progression of the scanning process of the object being scanned appears to be painted on the display device. In some embodiments, a three-dimensional representation of the object being captured may be displayed within the context of the scene in a current image frame. Furthermore, a fine adjustment may be made to the relative positions of the coarsely positioned sets of points.

FIGS. 13A-D illustrate a process of scanning an object by capturing a stream of successive image frames of the object, in accordance with some embodiments of the invention. In these examples, the object being scanned comprises a text document 1300. Although scanning of an object to form a two-dimensional image in two dimensions is shown, it should be appreciated that techniques, such as coarse positioning of image frames in a common frame of reference, fine alignment via feature matching and global optimization upon loop closing, may also apply when scanning an object to form a three-dimensional representation. As the scanning device, which may be a smartphone with a camera as described above, moves around the object, images of the object are captured at intervals, which are illustrated to be periodic in this example, thus resulting in a sequence of image frames. Each succeeding image frame may be initially positioned based on a respective preceding image frame to obtain an estimate of an initial pose of the succeeding image. As described above, position information representing movement and orientation of the scanning device obtained from the inertial sensors may be used to simplify the processing.

The image frames are shown in FIGS. 13A-D as superimposed over text document 1300 to demonstrate exemplary movements of the scanning device relative to the text document. It should be appreciated that each subsequent image frame may be oriented in any suitable way with respect to a preceding image frame as embodiments of the invention are not limited to any particular movement of the scanning device over an object being scanned. In the embodiment illustrated, an image frame is positioned based on comparison to an immediately preceding image frame, which is not a requirement of the invention. A succeeding image may be locally positioned by being aligned with respect to any other preceding frames if there is overlap.

Further details of determining relative positions of image frames representing a scan of an object are provided in FIGS. 13A-15. FIG. 13A shows that a first image frame 1302 in a stream of image frames may be captured as scanning of text document 1300 begins, upon any suitable trigger.

Next, as shown in FIG. 13B, a succeeding image frame 1304 may be captured that partially overlaps image frame 1302. In some embodiments, the scanning device may capture the stream of image frames at a rate that ensures that each new image frame partially overlaps at least one of the preceding image frames.

Figures 13C, 13D:
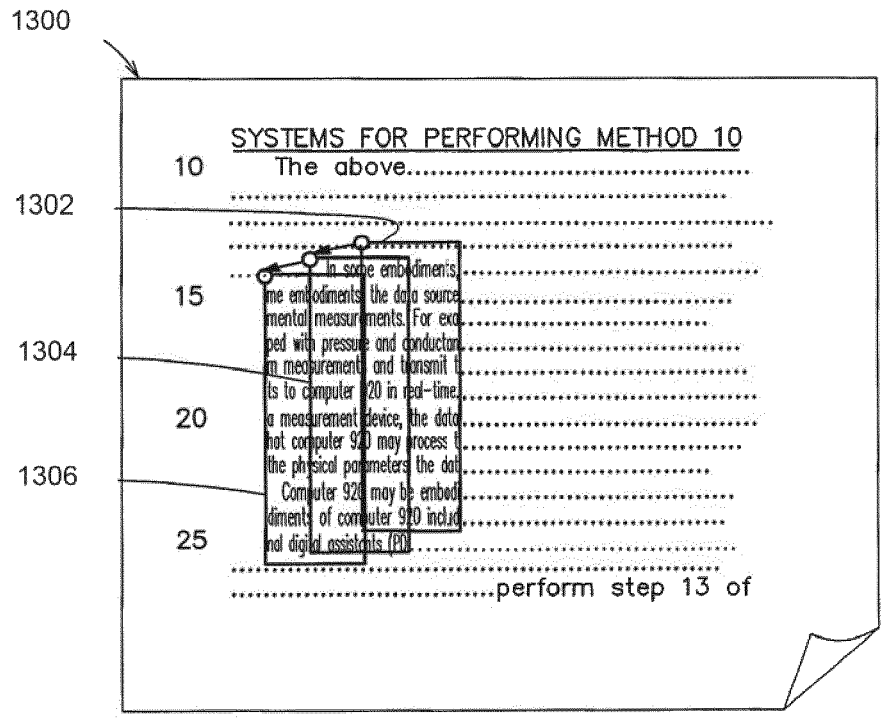

As new image frames are being captured as part of the stream of image frames, a subsequent image frame 1306 that partially overlaps preceding image frame 1304 may be captured, as shown in FIG. 13C. Further, a new image frame 1308 may be captured, as illustrated in FIG. 13D. Image frame 1308 partially overlaps image frame 1306.

Because motion of the smartphone is not constrained, each new image frame may overlap an immediately preceding image frame as well as other neighbor preceding frames. As illustrated in the example of FIG. 13D, respective areas of overlap of image frame 1308 with image frames 1302 and 1304 are larger than an area where image frame 1308 overlaps with the immediately preceding image frame 1306. However, in accordance with some embodiments, each new image frame is, for coarse positioning, positioned relative to an immediately preceding image frame.

Figure 14A:
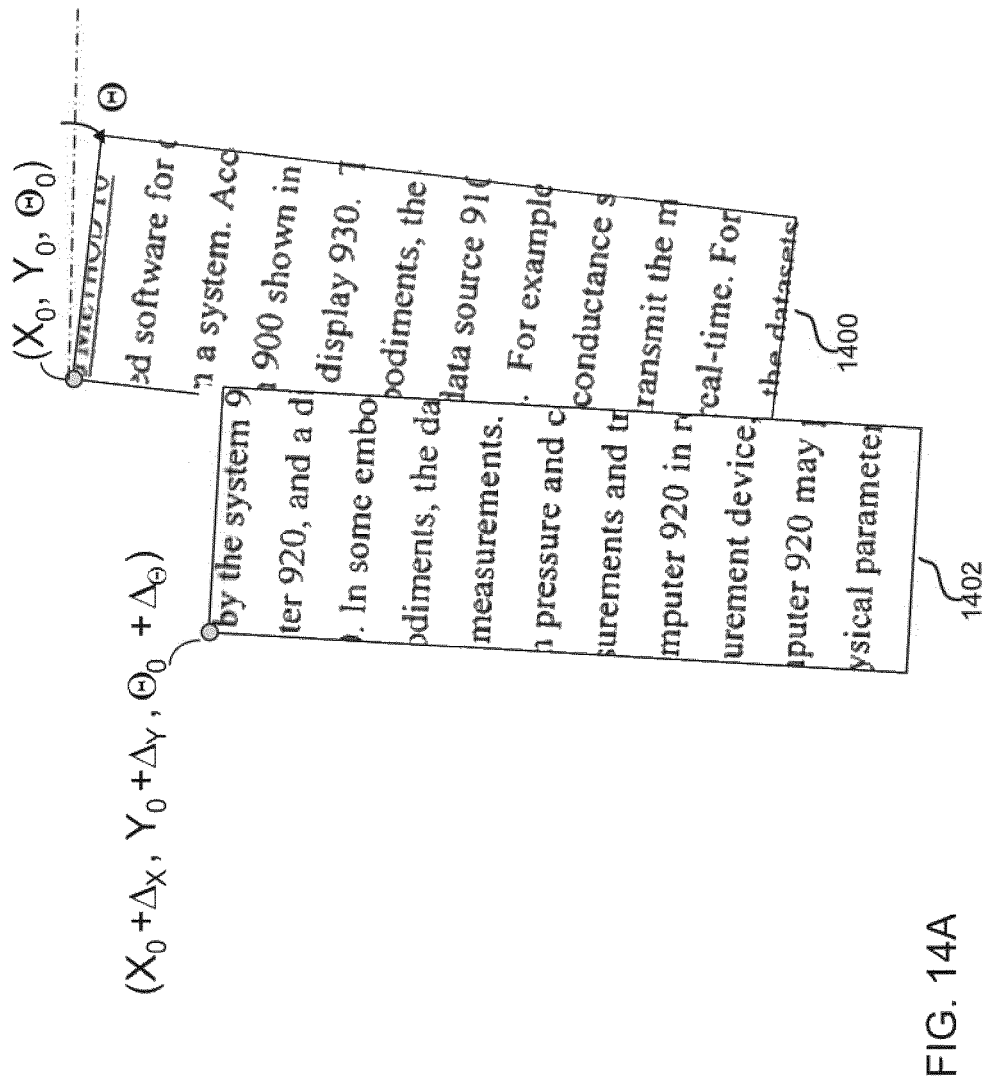
Figure 14B:
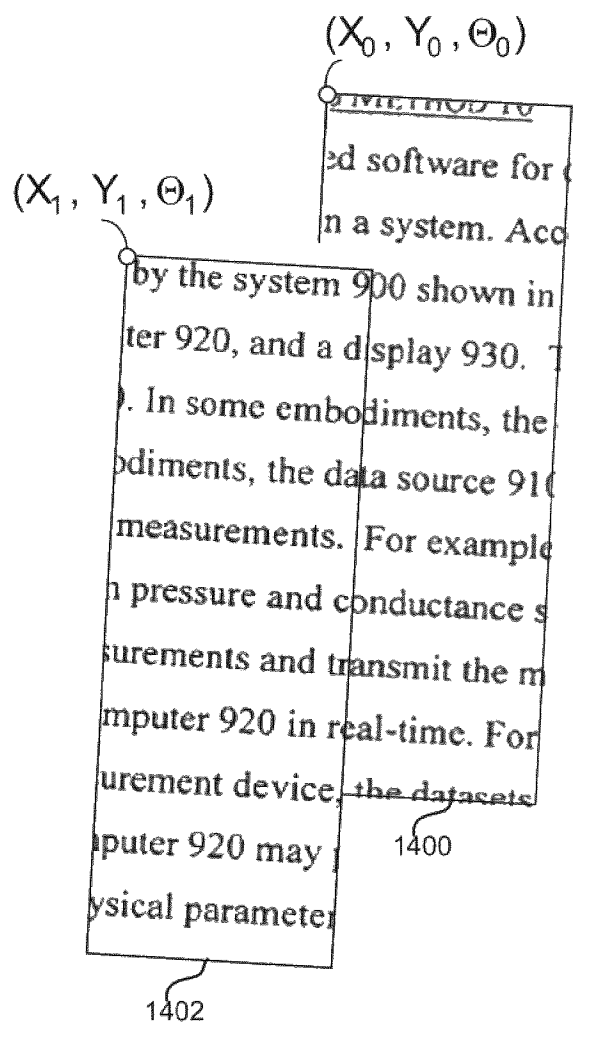

FIGS. 14A and 14B illustrate example of a first step that may occur in a process of determining a position of a subsequent image frame relative to a preceding image frame. The first step may be determining an initial estimate of a pose of an image frame with respect a preceding image frame. In the example shown in FIGS. 14A and 14B, an image frame 1400 and next an image frame 1402 may be captured as a user moves the smartphone over an object to be scanned. In this example, the object comprises a text document Although scanning of an object to form a two-dimensional image in two dimensions is shown, it should be appreciated that such techniques may also apply when scanning an object to form a three-dimensional representation.

FIG. 14A illustrates initial estimate of a pose of image frame 1402 based on information obtained by one or more inertial sensors (e.g., inertial sensors 206). Initial estimate of pose of image frame 1402 may be based on a change of output of the inertial sensors between the times at which image frames 1402 and 1404 are captured. In FIG. 14A, a pose of image frame 1400 is schematically shown as ($X_0$, $Y_0$, $\ominus_0$). In this example, $X_0$ and $Y_0$ denote a position of image frame 1400 in x and y dimensions, respectively, while $\ominus_0$ denotes a rotation of the image frame. Though not expressly illustrated in FIG. 14 A, a smartphone or other portable electronic device may be oriented in more than just these dimensions such that more than just these three parameters are used to define a pose. Separation between the smartphone or other portable device acquiring image frames and the object being imaged may also impact the pose such that the parameters defining a pose may include a "Z" dimension represent separation. Tilt of the smartphone in one or more dimensions relative to the object being imaged may also be parameters that characterize a pose of an image frame. Alternatively or additionally, characteristics of the image capture may also be regarded as parameters of a pose. For example, the zoom of the camera lens may be regarded as a separate parameter or may be reflected based on its impact on the value of the parameter for the Z dimension. These and other possible parameters that characterize the pose are not expressly illustrated for simplicity.

If image frame 1400 is the first image frame in the stream, its position may be taken as an origin for a frame of reference in which other image frames will be positioned. If image frame 1400 is not the first image frame in the stream, it may have a position determined relative to a preceding image frame, which in turn may either define the origin or have a position relative to the origin, through one or more intermediate image frames. Regardless of how many image frames are in the series, relative image poses of the image frames may define positions for all image frames.

Regardless of the position in the stream, each succeeding image frame after the first may be captured and processed as image frame 1402. An initial pose of image frame 1402 may be determined with respect to the pose of image frame 1400. During a time between when image frame 1400 is captured and when image frame 1402 is captured, the inertial sensors and/or other sensors indicate a change in the position of the smartphone or other device by a value of $\Delta x$ in the x direction and by a value of $\Delta y$ in the y direction. Also, the sensors used to obtain information on a position of the smartphone at a time when each image frame is captured may indicate a rotation of the device by a value of $\Delta\ominus$. The value of value of $\Delta\ominus$ may be determined according to processing as described below. Accordingly, the initial estimate of the pose of image frame 1402 with respect to image frame 1400 may be denoted as ($X_0+\Delta x$, $Y_0+\Delta y$, $\ominus_0+\Delta\ominus$). Though not expressly shown, changes in other parameters that characterize pose may be similarly determined. For example, changes in orientation or separation in the Z dimension may similarly be reflected in the new pose estimate.

FIG. 14A illustrates a degree of misalignment between image frames 1402 and 1400 that would provide a poor quality image. As shown in this example, the respective portions of the text of the scanned object do not match. To align image frame 1402 with the preceding image frame 1400 so that a good quality image can be generated, a matching portion of the image frames may be determined and the image frames may be aligned based on these portions. In some embodiments, those portions that are within a zone of uncertainty are first explored to position image frame 1402 with respect to image frame 1400. Any suitable technique may be used for the matching, which may be iteratively attempting to find a suitable match between the image frames. FIG. 14B shows image frame 1402 aligned with image frame 1400 based on the respective content of the image frames which is, in this example, the text. The adjusted pose of image frame 1402 is shown by way of example only as (X1, Y1, ⊖1). These values may represent the pose of image frame 1402 relative to the origin of the frame of reference. Though, because these values are derived based on positioning image frame 1402 relative to image frame 1400, they may be regarded and stored as relative values. It should be appreciated that in embodiments in which more parameters are used to characterize a pose, more than the three parameters illustrated in FIG. 14A would be stored.

Image frames that are locally positioned with respect to preceding image frames may be stored as a network of image frames, which may then be used for global positioning or other processing. The network may comprise nodes, representing image frames, and edges, representing relative position of one node to the next. That network of image frames may be represented as a graph map or in any other suitable way FIGS. 15A-D in conjunction with FIGS. 16A-16D illustrate the above concept of building a network of image frames based on local positioning of image frames. A reference point on each image frame, here illustrated as the upper left hand corner of each successive image may be used to represent the position of the image frame. Relative displacement of the reference point, from image frame to image frame, may be taken as an indication of the relative position of the image frames.

FIG. 16A-D represent respective nodes that may be added to the network as new image frames are acquired and locally matched with one or more previous image frames. Though, in the illustrated embodiment, each new image frame is matched to its immediately preceding image frame. In the network, any frames that have been locally matched will be represented by an edge between the nodes representing the frames that have been matched. Each edge is thus associated with a relative pose of an image frame with respect to a preceding image frame.

In FIGS. 15A-15C, image frames 1500, 1502 and 1504 are successively processed. As each new image frame is acquired, its initial pose estimated from navigation information, acquired for example from inertial sensors device, may be adjusted to provide an improved estimate of relative position of the new image frame, by aligning the new image frame with a preceding image frame. Thus, FIG. 15B shows that, as a new image frame 1502 is captured, its pose may be determined by matching image frame 1502 with a preceding image frame, which is, in this example, is image frame 1500. A relative pose of image frame 1502 with respect to image frame 1500 is thus determined. Similarly, when the next image frame 1504 is captured, its relative pose with respect to the preceding image frame 1502 may be determined in the same fashion, as shown in FIG. 15C.

FIGS. 16A-C conceptually illustrate the building of a network to represent the matching of successive image frames in a stream to determine their relative poses. As shown, nodes 1600, 1602 and 1604 representing the image frames 1500, 1502 and 1504, respectively, may be added to the network. In this example, each directed edge schematically indicates to which prior image frame relative pose information is available for a pair of frames. It should be appreciated that FIGS. 16A-16D conceptually represent data that may be stored to represent the network. The network may be stored as digital data in a data structure in computer memory. The data structure may have any suitable format. For example, each node may be stored as digital data acting as a pointer to another location in memory containing bits representing pixel values for an image frame. Other identifying information associated with a node may also be stored, such as a sequence number to allow the order in which image frames were captured to be determined. Likewise, edges may be stored as digital data representing the nodes that they join and the relative pose between those nodes. Moreover, information relating to capture conditions, such as a zoom setting or other settings applied to the hardware that acquired an image frame or status information generated by the controllers for that hardware may be stored in association with the nodes. One of skill in the art will appreciate that any suitable data structure may be used to store the information depicted in FIGS. 16A-16D.

As the stream of image frames is acquired, a user may move the smartphone back and forth across and around an object to be scanned, possibly tracing over regions of the object that were previously imaged. Accordingly, a new image frame that overlaps multiple preceding image frames may be captured. In the illustrated example, new image frame 1706 that overlaps image frames 1700, 1702 and 1704, as shown in FIG. 17D. A respective new node 1606 may be added to the network to represent image frame 1706, as illustrated in FIG. 16D Although scanning of an object to form a two-dimensional image in two dimensions is shown, it should be appreciated that such techniques may also apply when scanning an object to form a three-dimensional representation.

In the figures, the dark arrows indicate the relative positions initially used to add image frames to the network as part of fast processing. The dark arrows also illustrate an order in which image frames are captured, and the image frames may be said to be "layered" on top of each other as they are captured, so that the most recently captured image frame is placed, or layered, on top of prior image frames. Processing that renders a composite image based on the information stored in the network may use this overlapping information any suitable way. In some embodiments, for example, the most recently acquired image may be selected or overlapping image frames may be averaged or otherwise combined to improve the quality or resolution of the overall composite image. In other embodiments, processing may select between overlapping image frames to render the composite image based on the highest quality image frame to render a portion of the composite image. In yet further embodiments, when none of the image frames representing a portion of the composite image has suitable quality, processing may generate data to represent that portion of the composite image or acquire image data in any other suitable way.

In addition, the possibility of a new image frame overlapping multiple preceding image frames provides a possibility for a more accurate positioning of image frames based on global information, meaning information other than a match to an immediately preceding image.

Dashed lines shown in FIG. 16D may be a relative position of an image frame with respect to an overlapping image frame other than an immediately preceding image frame. Thus, node 1606 is shown to be connected, via respective edges, to nodes 1602 and 1604 which represent respective overlapping neighbor image frames. These edges may be added as part of processing in the quality track and may be used to more finely determine positions of image frames, as described in greater detail below.

Though FIGS. 15A-15D could be taken as demonstrating a sequence of image frames as they are captured, they could also be taken as a demonstration of what could be displayed for a user based on the network being built, as illustrated in FIGS. 16A-16D. As each image frame is captured and locally positioned, it may be presented on a display device in a position proportional to its determined position within the composite image represented by the network. For example, as the scanning process of the text document begins, image frame 1500 is first displayed. Next, when the user moves the scanning device and image frame 1502 is captured, respective larger portion of the composite image of the text document may be displayed to the user with a small delay, which may not be perceived by the user as disrupting or slowing down the scanning process. Thus, the composite image on the display may appear to the user as if the object being scanned is being painted on the display as the user moves the scanning device over the object.

Image stitching techniques in accordance with some embodiments of the invention may be used to generate a composite image of a scanned object of any suitable type. As shown in the above examples, the object being scanned may be a text document, an image, a graph, or any combination thereof. Further, content the object may be in represented in grayscale or it may comprise various colors. Image frames representing text, such as is illustrated in FIGS. 15A-15D, may contain multiple edges or other features that may be used in aligning image frames. For example, such features as lines and corners may be used if the scanned object includes text and/or image(s). Though, techniques as described herein are not limited to such embodiments.

FIGS. 17A-17C show that a relative pose of each new image frame may be determined by matching the image frame with a preceding image frame, even if the image does not represent or other content with many features that can be easily identified. To perform the matching, identical content in the matched image frames is determined and may be matched other than based on corresponding features. For examples regions may be matched based on a pixel-to-pixel comparison, comparisons of gradients or other image characteristics.

For example, image frames may be aligned using area-based matching. As shown in image frames illustrated in FIGS. 17A-17C, the content of an object being scanned (e.g., a photo rather than text) may be an image having content of different color gradient across the image. Hence, the area-based matching may be suitable for aligning image frames of such object. Also, FIGS. 17B and 17C illustrate that motion of a scanning device between successive image frames may involve rotation in addition to displacement in an x-y plane. Rotation may be reflected in the angular portion of the relative pose between frames. Though not expressly illustrated in FIGS. 17A-17C, other parameters, such as tilt and Z dimension also may impact the relative pose.

FIG. 18 is another example of a further technique that may be applied in constructing a network of image frames as new image frames are captured and respective nodes representing the frames are added to the network. As in the example of FIGS. 16A-16D, the network is represented graphically, but in a computer, the network may be represented by digital values in a computer memory.

FIG. 18 shows the state of the network after a scanning device has been moved in one swipe, generally in the direction 1814. In this example, the pose of the first image frame in the network, represented by node 1810, may be taken as a reference point. The pose of any other image frame in the network may be determined by combining the relative poses of all edges in a path through the network from node 1810 to the node representing the image frame. For example, the pose of image frame associated with node 1812 may be determined be adding the relative poses of all edges in the path between node 1810 and 1812. A pose of each image frame, determined in this way, may be used for displaying the image frame as part of a composite image.

Determining a pose of an image frame based on adding relative poses along a path through the network also has the effect of accumulating errors in determining relative pose of each image frame area also accumulated. Such errors can arise, for example, because of noise in the image acquisition process that causes features or characteristics in one image frame to appear differently in a subsequent image frame. Alternatively, features in consecutive image frames with similar appearances, that actually correspond to different portions of an object being scanned, may be incorrectly deemed to correspond. Thus, for any number of reasons, there may be errors in the relative poses. For image frames along a single swipe, though, these errors in relative pose may be small enough so as not to be noticeable.

However, as a user swipes a scanning device back and forth across an object, motion of the scanning device in direction 1824 will generate image frames acquired at a later time adjacent image frames acquired at an earlier time. In particular, as the path through the network proceeds beyond node 1812 along segment 1816, eventually, a node 1818 on the path will have a position near node 1820. When this occurs, the accumulated errors in relative positions along the path, including segment 1816, may be substantial enough to create a noticeable effect in a composite image including image frames associated with nodes 1818 and 1820, if both nodes are positioned based on accumulated relative poses in paths from node 1810. Positioning of image frames in the composite image, for example, may create a jagged or blurred appearance in the composite image.

To provide an image of suitable quality, further processing may be performed on the network. This processing may be performed in a separate "track" from the processing that is integrating each new image frame in the sequence into the network. This "quality track" processing may be performed in a separate process or, in a separate processing thread, than processing to incorporate image frames into the network. In some embodiments, this quality track processing may be performed concurrently with processing to incorporate new image frames into the network. However, the specific implementation of the quality track processing is not a limitation of the invention.

This processing may adjust the relative pose information along the edges of the network to avoid the effects of accumulated errors in relative pose. Accordingly, during the scanning process in accordance with some embodiments of the invention, as new image frames are being captured and stitched into the composite image, a fine adjustment may be made to the determined relative positions of image frames already in the network. Fine adjustments may be made in parallel to the coarse positioning of successive image frames such that displayed image quality may improve as the scan progresses. Fine adjustments may be based on global positioning of image frames which may involve determining a position of an image frame within the composite image based on positioning of image frames other than the immediately preceding image frame.

Other processing techniques may be applied to the composite image as it is being formed or in processing after the composite image is formed. These processing techniques may be based on physical characteristics of the image, such as contrast or white balance. Alternatively or additionally, processing techniques may be based on the content of the image acquired. An example of a processing technique based on image content is an item removal process.

A piece of paper or other object imaged with a smartphone is often held down by a user or fixed with the hand for easier capture. As a result, one or more image frames may include distracting features, such as an image of the user's finger or other extraneous items, which may be undesirable to be included in the image of the document.

Accordingly, in some embodiments, processing of image frames to form a composite image may entail improving quality of the composite image by determining a segment of the composite image depicting the user's finger or other item that is unlikely to be desired in the composite image. Further processing may replace that segment with a less objectionable segment, such as a segment of a background color or other content of the detected object.

After acquiring data for a three-dimensional representation of an object and post-processing of the data, the data and any associated metadata may be stored in a data file. The data file may have any suitable format. In some embodiments, the file is in a portable document format (PDF). The file may have a 3D portable document format. Such a PDF file may be displayed using PDF supported programming applications, such as a PDF viewer. Additionally or alternatively, the file in the portable document format, may also be provided to a three dimensional printer. Such a three dimensional printer may support data files in a PDF and the printer may correctly interpret the data in the data file. However, in some instances, a three dimensional printer may not support a PDF file and another format for the data file may be required in order to print a 3D model of the object. Some embodiments of the present invention may use techniques for converting data from a PDF into other formats suitable for three dimensional printers.

Figure 19:
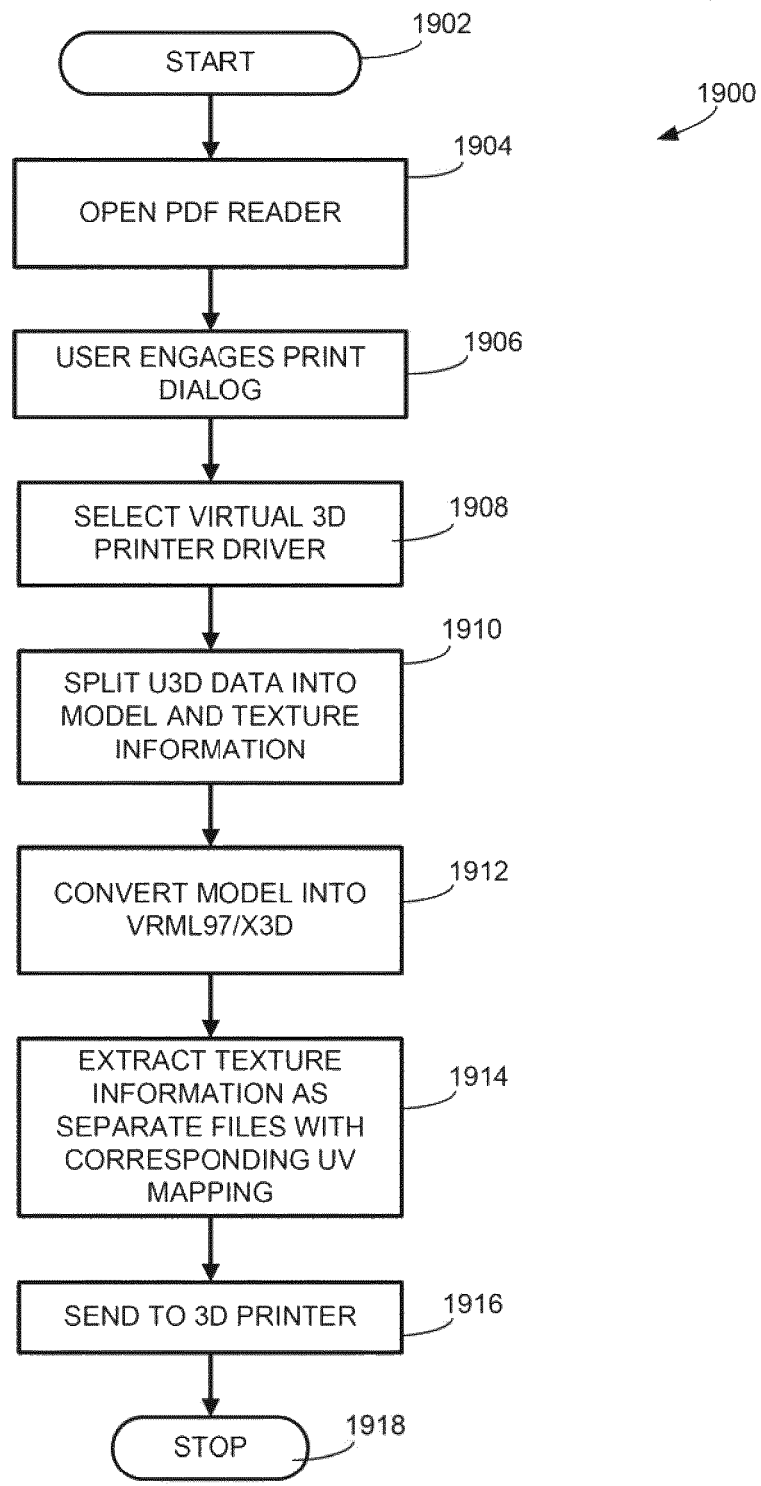
FIG. 19 is a flowchart of a process of converting a three-dimensional image into a file format printable on a 3D printer, in accordance with some embodiments of the invention.

FIG. 19 illustrates an example for a process 1900 of converting a three-dimensional image into a file format printable on a 3D printer, in accordance with some embodiments of the invention. Changing the file format of the data may occur on the smartphone or portable electronic device used to scan the object and/or on any suitable processor. Such a process may start 1902 based on user input and/or be triggered to start after capturing and processing of the image frames.

Once initiated, an application suitable for rendering the three-dimensional image on a display, such as PDF Reader, may be opened by block 1904. Within the visualization application, a user may engage a print dialog as illustrated by block 1906. Such a print dialog may be engaged in any suitable way. Within the print dialog, a driver for a three-dimensional printer may be selected according to block 1908. The printer driver may be selected based on user input. In some embodiments, the printer driver may be automatically selected, such as by a default option and/or by a signal received from the printer connected to the device with the data file. Such a three-dimensional printer driver may also be a virtual three-dimensional printer driver.

After a three-dimensional printer driver is selected, the data file may be converted to a data format suitable for a three-dimensional printer associated with the driver. Data for the mesh model or convex hull may be separated from the texture information data. When the initial data file has a PDF, the data may have a U3D format and/or a PRC format. In the example illustrated in FIG. 19, data in a U3D format is split into the data for the mesh model and data for the texture information by block 1910. The model data may then be converted to a format that may be suitable for a three-dimensional printer based on the driver selected by block 1908. FIG. 19 has an example where the model data may be converted into a VRML97 and/or a X3D format. The extracted texture information may be stored in a separate file, as illustrated by block 1914. Such a texture information file may contain mapping information for how the texture information maps to the mesh model. The mapping information may be stored using UV mapping techniques known in the art. After the data is converted into files suitable for 3D printing, the files containing the three-dimensional representation of the object and any additional information from post-processing may be sent to a three-dimensional printer 1916. Additionally or alternative, the converted data files may be stored and may be printed at a later time. Process 1900 may end by block 1918 when after the data files have been converted into a format suitable for three-dimensional printing and/or printed.

Having thus described several aspects of at least one embodiment of this invention, it is to be appreciated that various alterations, modifications, and improvements will readily occur to those skilled in the art.

For example, information was described as being stored in a file, such as a file in a portable document format. It should be appreciated that a file may have any suitable format. In some embodiments, a file may be a collection of information maintained by a file management system within an operating system. Such a file may have a predefined organization recognizable by any device using the same operating system or compatible with that operating system. However, it should be appreciated that, as used herein, file may refer to any arrangement of information maintained by any component.

As a further example, depth information for features relative to a camera are described being acquired with a single camera taking images from multiple points of view. In some embodiments, a second imaging mode may be included to obtain depth information. For example, an RGB-D camera (IR/depth camera), such as is found in a KINECT gaming device may be used to acquire depth information.

Also, embodiments are described in which a file post-processed to ensure that it is suitable for three-dimensional printing. In other embodiments, some or all of the checks for 3D-printability may be performed while image frames are being captured, rather than as a post processing step.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A portable electronic device, comprising:
a camera configured to acquire a plurality of image frames;
at least one processor configured to, while the camera acquires the plurality of image frames:
   form a first representation of an object from the plurality of image frames acquired with the camera from a plurality of directions, the representation comprising locations in a three-dimensional space of features of the object;
   determine, from the first representation, a second representation of the object, the second representation comprising locations of one or more surfaces;
   automatically identify, from the second representation, surfaces that are not printable in three dimensions;
   provide information to a user of the camera instructing the user to capture additional image frames of a region of the object corresponding to the identified surfaces that are not printable in three dimensions, wherein providing the information includes:
      displaying the object with at least one colored frame to indicate the region of the object corresponding to the identified surfaces that are not printable in three dimensions; and
      outputting, to the user, position information indicating a position and an orientation of the camera to be used to capture the additional image frames, the position and the orientation of the camera determined to avoid creating image artifacts; and
   modify the second representation to remove at least one of the identified surfaces that are not printable in three dimensions,
wherein the at least one processor is further configured to store the modified second representation as a three-dimensional printable file.

2. The portable electronic device of claim 1, wherein:
modifying the second representation to remove surfaces that are not printable in three dimensions comprises removing surfaces that are not joined to other surfaces to provide a wall thickness above a threshold.

3. The portable electronic device of claim 1, wherein:
modifying the second representation to remove surfaces that are not printable in three dimensions comprises removing surfaces that are not a part of a closed hull.

4. The portable electronic device of claim 1, wherein:
modifying the second representation to remove surfaces that are not printable in three dimensions comprises computing normals to surfaces to remove surfaces having a normal in a direction toward an interior of a hull.

5. The portable electronic device of claim 1, wherein:
the device further comprises one or more inertial sensors, and
the at least one processor is further configured to form the first representation based on outputs of the one or more inertial sensors when the plurality of image frames is acquired.

6. The portable electronic device of claim 1, wherein:
the device further comprises a display; and
the at least one processor is further configured to render an image of the object based on a first portion of the plurality of image frames while a second portion of the plurality of image frames is being acquired.

7. The portable electronic device of claim 1, wherein:
the three-dimensional printable file is in a portable document format.

8. The portable electronic device of claim 1, wherein:
the three-dimensional printable file comprises separate information about structure of the object and visual characteristics of the structure.

9. A method of forming a file for printing on a three-dimensional printer, the file comprising a representation of an object, the method comprising:
acquiring a plurality of image frames using a camera of a portable electronic device; and
while the image frames are being acquired:
   constructing a first three-dimensional representation of the object;
   determining a second three-dimensional representation of the object, by calculating a convex hull of the object;
   automatically identifying, from the second three-dimensional representation, areas that are not printable in three dimensions;
   providing information to a user of the camera instructing the user to capture additional image frames of a region of the object corresponding to the identified surfaces that are not printable in three dimensions, wherein providing the information includes:
      with the object on the display, depicting a boundary around at least a portion of the object, wherein the boundary indicates:
         the region of the object corresponding to the identified surfaces that are not printable in three dimensions; and
         position information indicating a position and an orientation of the camera to be used to capture the additional image frames, the position and the orientation of the camera determined to avoid creating image artifacts;
   adding at least one support structure to the second three-dimensional representation of the object that is not present in the first three-dimensional representation of the object; and
   displaying a view of the second three-dimensional representation on a two dimensional screen.

10. The method of claim 9, the method further comprises modifying the second three-dimensional representation to remove surfaces that are not printable in three dimensions.

11. The method of claim 10, wherein modifying the second three-dimensional representation to remove surfaces that are not printable in three dimensions comprises removing surfaces that are not joined to other surfaces to provide a wall thickness above a threshold.

12. The method of claim 10, wherein modifying the second three-dimensional representation to remove surfaces that are not printable in three dimensions comprises removing surfaces that are not a part of the convex hull.

13. The method of claim 10, wherein modifying the second three-dimensional representation to remove surfaces that are not printable in three dimensions comprises computing normals to surfaces to remove surfaces having a normal in a direction toward an interior of the convex hull.

14. The method of claim 9, wherein constructing the first representation comprises constructing the first representation based on outputs of one or more inertial sensors of the portable electronic device when the plurality of image frames is acquired.

15. The method of claim 9, the method further comprises rendering an image of the object based on a first portion of the plurality of image frames while a second portion of the plurality of image frames is being acquired.

16. The method of claim 9, wherein the three-dimensional printable file is in a portable document format.

17. The method of claim 9, wherein the three-dimensional printable file comprises separate information about structure of the object and visual characteristics of the structure.

18. At least one non-transitory, tangible computer-readable storage medium having computer-executable instructions, that when executed by a processor, perform a method of forming a three dimensional representation of an object from a plurality of image frames captured with a camera of a portable electronic device, the method comprising:
   acquiring a plurality of image frames using a camera of a portable electronic device;
   while the image frames are being acquired:
      forming a first representation of the object from the plurality of image frames, the representation comprising locations in a three-dimensional space of features of the object;
      determining, from the first representation, a second representation of the object, the second representation comprising locations of one or more surfaces; and
      operating a processor so that it automatically identifies surfaces from the second representation that are not printable in three dimensions;
      operating the processor to provide information to a user of the camera instructing the user to capture additional image frames of a region of the object corresponding to the identified surfaces that are not printable in three dimensions, wherein providing the information includes:
         with the object on the display, depicting an at least one colored frame around at least a portion of the object to indicate the region of the object corresponding to the identified surfaces that are not printable in three dimensions; and
         outputting, to the user, position information indicating a position and an orientation of the camera to be used to capture the additional image frames, the position and the orientation of the camera determined to avoid creating image artifacts; and
      operating the processor to modify the second representation to remove at least one of the identified surfaces that are not printable in three dimensions; and
      storing the modified second representation as a three-dimensional printable file.

19. The at least one computer-readable storage medium of claim 18, wherein modifying the second representation to remove surfaces that are not printable in three dimensions comprises removing surfaces that are not joined to other surfaces to provide a wall thickness above a threshold.

20. The at least one computer-readable storage medium of claim 18, wherein modifying the second representation to remove surfaces that are not printable in three dimensions comprises removing surfaces that are not a part of a closed hull.

21. The at least one computer-readable storage medium of claim 18, wherein modifying the second representation to remove surfaces that are not printable in three dimensions comprises computing normals to surfaces to remove surfaces having a normal in a direction toward an interior of a hull.

22. The at least one computer-readable storage medium of claim 18, wherein forming the first representation comprises forming the first representation based on outputs of one or more inertial sensors of the portable electronic device when the plurality of image frames is acquired.

23. The at least one computer-readable storage medium of claim 18, wherein the method further comprises rendering an image of the object based on a first portion of the plurality of image frames while a second portion of the plurality of image frames is being acquired.

24. The at least one computer-readable storage medium of claim 18, wherein the three-dimensional printable file is in a portable document format.

25. The at least one computer-readable storage medium of claim 18, wherein the three-dimensional printable file comprises separate information about structure of the object and visual characteristics of the structure.

* * * * *